United States Patent
Jung et al.

(10) Patent No.: US 10,326,872 B2
(45) Date of Patent: Jun. 18, 2019

(54) MOBILE TERMINAL AND METHOD FOR CONTROLLING THE SAME

(71) Applicant: LG ELECTRONICS INC., Seoul (KR)

(72) Inventors: Juhyun Jung, Seoul (KR); Kyunghye Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/824,148

(22) Filed: Nov. 28, 2017

(65) Prior Publication Data

US 2019/0052744 A1 Feb. 14, 2019

(30) Foreign Application Priority Data

Aug. 11, 2017 (KR) .......................... 10-2017-0102046

(51) Int. Cl.
| | |
|---|---|
| *G06F 3/0354* | (2013.01) |
| *H04M 1/725* | (2006.01) |
| *G06F 3/041* | (2006.01) |
| *G06F 3/0481* | (2013.01) |
| *G06F 3/01* | (2006.01) |

(52) U.S. Cl.
CPC ........ *H04M 1/72522* (2013.01); *G06F 3/016* (2013.01); *G06F 3/0414* (2013.01); *G06F 3/04817* (2013.01); *H04M 2250/22* (2013.01)

(58) Field of Classification Search
CPC combination set(s) only.
See application file for complete search history.

(56) References Cited

U.S. PATENT DOCUMENTS

| | | | |
|---|---|---|---|
| 9,563,319 B2* | 2/2017 | Vandermeijden | G06F 3/044 |
| 2015/0192989 A1* | 7/2015 | Kim | G06F 3/011 |
| | | | 345/156 |

FOREIGN PATENT DOCUMENTS

EP 2 905 679 A1 8/2015

\* cited by examiner

*Primary Examiner* — Van N Chow
(74) *Attorney, Agent, or Firm* — Birch, Stewart, Kolasch & Birch, LLP

(57) ABSTRACT

Disclosed are a mobile terminal and method for controlling the same. Particularly, the present invention provides a mobile terminal including a grip sensor, a display unit, and a processor. In this case, the processor may be configured to sense a first input with a predetermined area through the grip sensor in a state in which the mobile terminal is gripped by a user and display a first menu icon at a first point corresponding to the first input on the display unit after sensing the first input.

14 Claims, 21 Drawing Sheets

(a)

(b)

Shortcuts
-New memo
-New calendar event
-Take selfie
-Customize bar

Capture tools
-Capture
-Extended capture
-Capture & Crop
-GIF capture

Music player
-Music play/pause
-Select music

Quick contacts
-Call
-Send message

Incoming call
-Answer
-Decline (a)

[Settings]　　　　　　[Edit shortcuts]

(b)

(a)

(b)

MOBILE TERMINAL AND METHOD FOR CONTROLLING THE SAME

Pursuant to 35 U.S.C. § 119(a), this application claims the benefit of earlier filing date and right of priority to Korean Application No. 10-2017-0102046, filed on Aug. 11, 2017, the contents of which are hereby incorporated by reference herein in its entirety.

BACKGROUND OF THE INVENTION

Field of the Invention

The present invention relates to a mobile terminal and method for controlling the same, and more particularly, to a mobile terminal for sensing an input through a grip sensor and displaying a menu icon at a point where the input is sensed while the mobile terminal is gripped and method for controlling the same.

Discussion of the Related Art

Generally, terminals can be classified as mobile/portable terminals and stationary terminals according to their mobility. The mobile terminals can be further classified as handheld terminals and vehicle mount terminals according to possibility of user's direct portability.

The mobile terminals have become increasingly more functional. Examples of such functions include data and voice communication, image and video capturing through a camera, voice recording, music file playback through a speaker system, and image and video displaying through a display unit. Some mobile terminals include additional functions for supporting game playing and working as multimedia players. In particular, current mobile terminals can receive multicast signals including visual contents such as videos and television programs.

As functions of a mobile terminal are diversified, the mobile terminal becomes the multimedia player with multiple functions of capturing images or videos, playing back music files or video files, gaming, and receiving broadcasting programs.

To support and increase the functionality of the terminal, the improvement of structural parts and/or software parts of the terminal can be taken into account.

Recently, the mobile terminal with a screen ratio of 18:9, which is greater than the conventional screen ratio of 16:9, has been developed. As the mobile terminal with a larger screen than the conventional one has been developed, a user of the mobile terminal can partition a display unit for its use. For example, the user can launch different applications in the bottom and top portions of the mobile terminal by partitioning the display unit.

However, when the user desires to simultaneously launch a plurality of applications on the display unit, the user may experience the following problems. That is, the user has to execute multiple configuration processes to partition the display unit. In addition, even though the user completes the partition of the display unit, the user may not adjust a desired ration or location.

SUMMARY OF THE INVENTION

Accordingly, an object of the present invention is to address the above-noted and other problems.

Another object of the present invention is to provide a mobile terminal for sensing an input with a predetermined area through a grip sensor and displaying a menu icon at a point corresponding to the input on a display unit after sensing the first input in a state in which the mobile terminal is gripped by a user and method for controlling the same.

To achieve these objects and other advantages and in accordance with the purpose of the invention, as embodied and broadly described herein, a mobile terminal according to the present invention may include a sensing unit including a grip sensor; a display unit; and a processor. In this case, the processor may be configured to sense a first input with a predetermined area through the grip sensor in a state in which the mobile terminal is gripped by a user and display a first menu icon at a first point corresponding to the first input on the display unit after sensing the first input.

Additionally, when the processor senses the first input while launching a predetermined content, the processor may be configured to display a second menu icon on the first point after sensing the first input, wherein the second menu icon may be an icon for launching a first application.

Additionally, the processor may be configured to determine the first application based on the predetermined content.

Additionally, the processor may be configured to sense a second input while displaying the second menu icon, wherein the first and second inputs may be continuous, and launch the first application in a multitasking mode after sensing the second input.

Additionally, when the second input is touch-released at a second point, the processor may be configured to launch the first application in a first multitasking mode, wherein the first multitasking mode may be a mode for displaying the first application on the content in an overlaying manner. When the second input is touch-released at a third point, the processor may be configured to launch the first application in a second multitasking mode, wherein the second multitasking mode may be a mode for displaying the content and the first application on a dual window.

Additionally, when the second input is touch-released on a fourth point, the processor may be configured to launch the first application in a second multitasking mode, wherein the first application may be displayed on a first area of a dual window. When the second input is touch-released on a fifth point, the processor may be configured to launch the first application in the second multitasking mode, wherein the first application may be displayed on a second area of the dual window.

Additionally, the processor may be configured to determine at least one of a size and a location of the first area based on the fourth point and determine at least one of a size and a location of the second area based on the fifth point.

Additionally, the processor may be configured to sense a third input while displaying the second menu icon, wherein the first and third inputs may be continuous. When the third input is touch-scrolled by a predetermined distance or more, the processor may be configured to change the second menu icon to a third menu icon, wherein the third menu icon may be an icon for launching a second application.

Additionally, the third input may be sensed on a side of the display unit.

Additionally, the processor may be configured to determine the second application based on the predetermined content.

Additionally, when the processor senses the first input during a predetermined time or more while displaying the second menu icon, the processor may be configured to change the second menu icon to an icon list including at least one menu icon.

Additionally, the processor may be configured to sense a fourth input while displaying the second menu icon, wherein the fourth input may have a pressure higher than that of the first input. The processor may be configured to display the first application on a first area of the content in an overlaying manner after sensing the fourth input.

Additionally, the processor may be configured to adjust a size of the first area based on the pressure of the fourth input.

Additionally, when a size of the first area becomes equal to or greater than a predetermined value, the processor may be configured to display the first application on a full screen.

Additionally, when a size of the first area becomes equal to or greater than a predetermined value, the processor may be configured to generate at least one of audio feedback, visual feedback, haptic feedback, and vibration feedback.

Additionally, the mobile terminal may further include a communication unit. When an event is received from the communication unit, the processor may be configured to change the first menu icon to a fourth menu icon, wherein the fourth menu icon may be an icon for launching an application corresponding to the event.

Additionally, when the processor senses a fifth input while displaying the second menu icon, the processor may be configured to launch the first application.

Additionally, when sensing of the first input is terminated, the processor may be configured to either stop the display of the first menu icon or display the first menu icon transparently.

In another aspect of the present invention, provided herein is a method for controlling a mobile terminal, including: sensing a first input with a predetermined area through a grip sensor in a state in which the mobile terminal is gripped by a user; and displaying a first menu icon at a first point corresponding to the first input on a display unit after sensing the first input.

Accordingly, the mobile terminal and method for controlling the same according to the present invention provide the following effects and/or advantages.

According to at least one embodiment of the present invention, when a mobile terminal senses an input with a predetermined area through a grip sensor while the mobile terminal is gripped by a user, the mobile terminal can display a menu icon at a point corresponding to the input on a display unit. Therefore, the user can easily execute a multitasking mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

The terms such as "include" or "has" should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
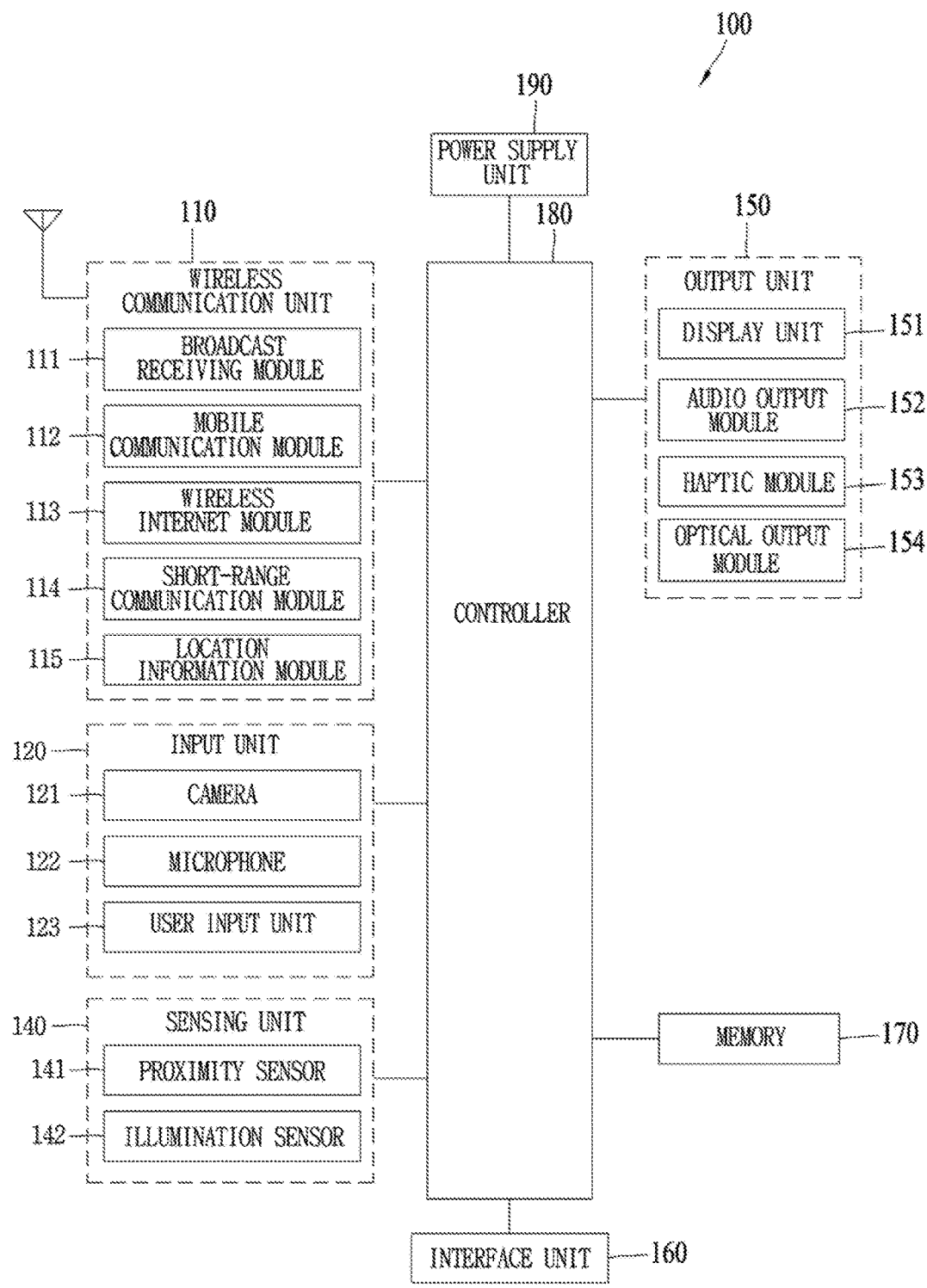
FIG. 1A is a block diagram of a mobile terminal in accordance with the present disclosure.
Figure 1B:
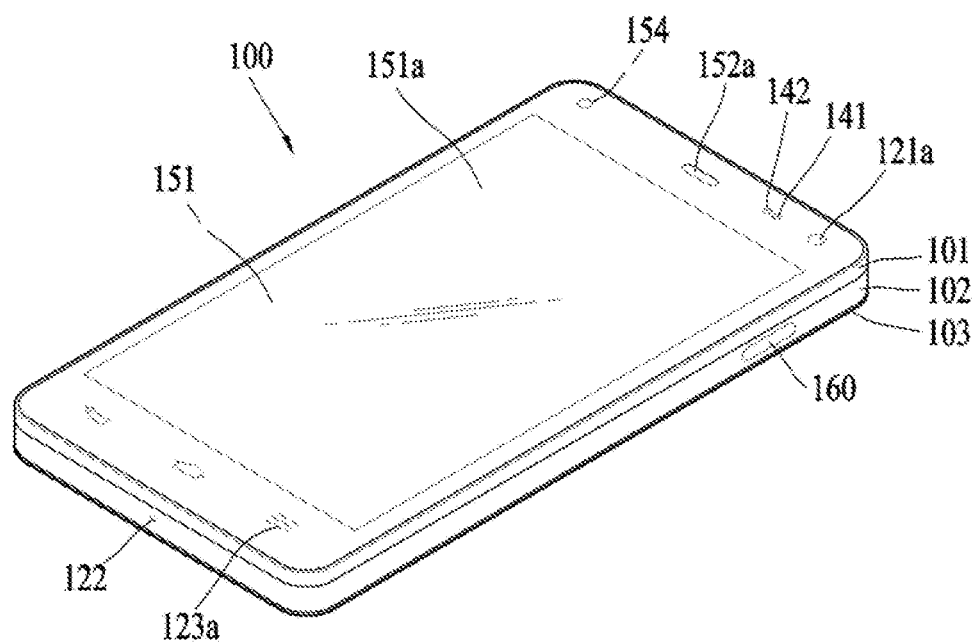
FIGS. 1B and 1C are conceptual views of one example of the mobile terminal, viewed from different directions.
Figure 1C:
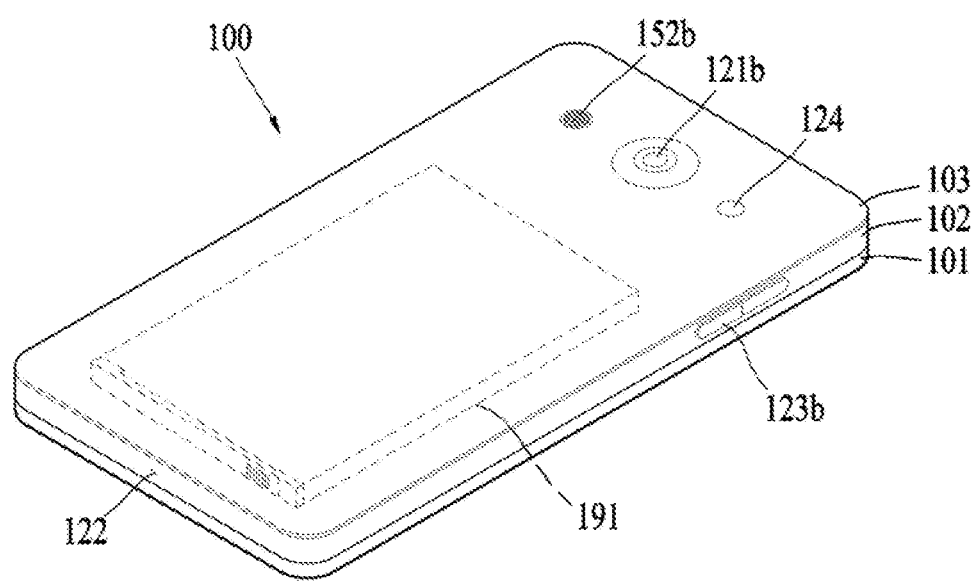

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
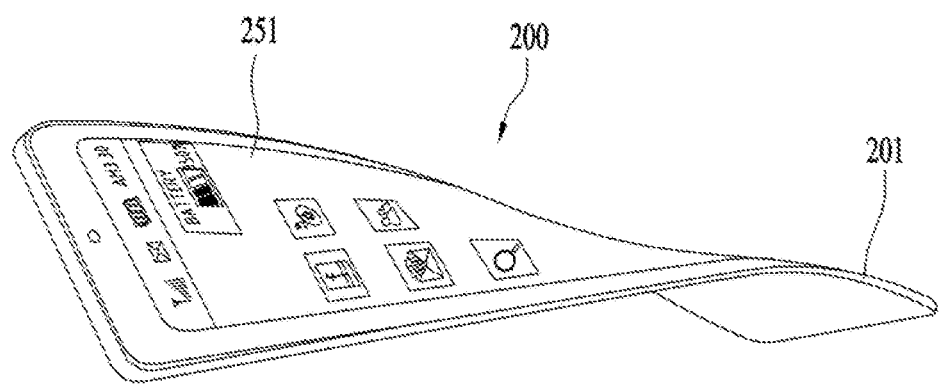
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The mobile terminal, which will be described with reference to FIGS. 3 to 22, can be implemented using one of the mobile terminals 100 and 200 illustrated in FIGS. 1 and 2.

In the following description, the embodiments of the present invention will be explained with reference to FIGS. 3 to 22. In addition, the foregoing description with reference to FIGS. 1 to 3 is provided for ease in description and understanding of the embodiments of the present invention.

Figure 3:
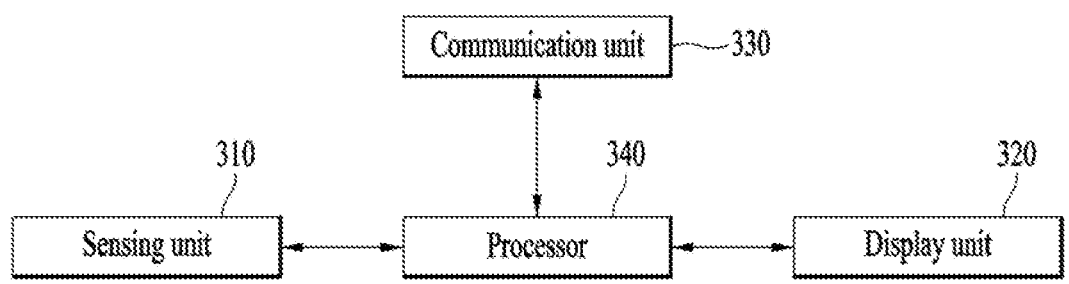
FIG. 3 is a block diagram illustrating configuration modules of a mobile terminal according to one embodiment of the present invention.

FIG. 3 is a block diagram illustrating configuration modules of the mobile terminal according to one embodiment of the present invention;

Referring to FIG. 3, the mobile terminal according to one embodiment of the present invention can include a sensing unit 310, a display unit 320, a communication unit 330 and a processor 340.

The sensing unit 310 may be configured to sense not only various user inputs inputted into the mobile terminal but also an environment of the mobile terminal and deliver a sensing result to enable the processor 340 to perform operation based on the sensing result. In the present invention, the sensing unit 310 may be disposed on the display unit 320 so as to be implemented as a touch screen. In addition, to implement the sensing unit 310, the sensing unit 140 of FIG. 1A may be used.

In an embodiment of the present invention, the sensing unit 310 may be configured to sense a touch input from a user. In this case, the sensing unit 310 may sense a point at which the touch input is sensed, a touched area, a touch pressure, and the like.

In an embodiment of the present invention, the sensing unit 310 may include a grip sensor. In this case, the grip sensor may detect whether the user grips the mobile terminal with the hand. In detail, the mobile terminal may detect whether the user grips the mobile terminal with the hand through various sensors included in the mobile terminal (e.g., at least one of a proximity sensor, illumination sensor, touch sensor, acceleration sensor, gravity sensor, gyroscope sensor, motion sensor, and sensor which will be developed later). Hereinafter, it is assumed that the grip sensor disposed on the mobile terminal determines whether the mobile terminal is gripped by the user's hand. In addition, the grip sensor may also sense the touch input from the user as the grip sensor itself. Further, the grip sensor may be included in a bezel part, which is disposed at the side of a body of the mobile terminal, or the side of the display unit.

The display unit 320 may be configured display visual information. In this case, the visual information may include a text, indicator, icon, content, application, image, video, etc. In addition, the display unit 320 may be configured to display the visual information on a screen based on a control command from the processor 340. Moreover, the display unit 320 may be implemented using the display unit 151 in FIG. 1A.

In an embodiment of the present invention, the display unit 320 may be configured to display a predetermined menu icon on a predetermined point based on an input signal. In addition, the display unit 320 may be partitioned to simultaneously display at least one application.

The communication unit 330 may be configured to include at least one module capable of communication with the outside. Here, the outside may include an external device and external server. In addition, the communication unit 330 may be implemented using the wireless communication unit 110 in FIG. 1A but all functions of the wireless communication unit 110 can also be performed using a wired cable.

In an embodiment of the present invention, the communication unit 330 may be configured to receive an event from the outside. For example, the event may include a call from another device, SMS reception, etc.

The processor 340 may be configured to perform processing on data, control the respective units of the mobile terminal, and control data transmission and reception between the units. In the present invention, the processor 340 can be implemented using the controller 180 of FIG. 1A.

In an embodiment of the present invention, the processor 340 may be configured to control operations of the mobile terminal. However, for convenience of description, it is assumed that these operations are performed/controlled by the mobile terminal.

Figure 4:
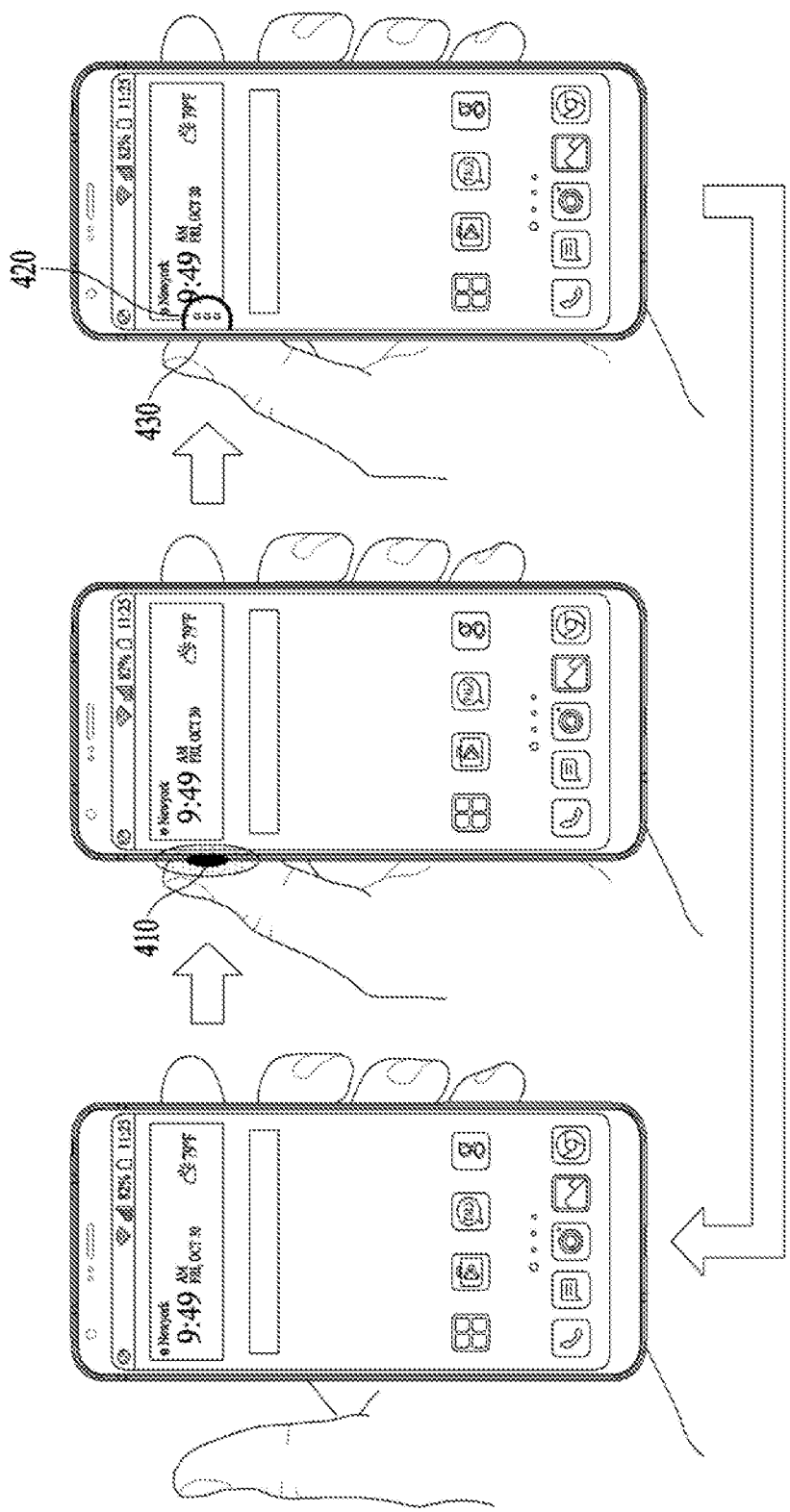
FIG. 4 is a diagram illustrating an embodiment for displaying a menu icon on the mobile terminal according to one embodiment of the present invention.

FIG. 4 is a diagram illustrating an embodiment for displaying a menu icon on the mobile terminal according to one embodiment of the present invention. To avoid redundant description, the features already mentioned in FIG. 3 are omitted in the embodiment of FIG. 4.

Referring to the first drawing of FIG. 4, the mobile terminal can detect that the user grips the mobile terminal. In other words, the mobile terminal can detect that the mobile terminal is gripped by the user's hand through the aforementioned sensing unit 310. In addition, the mobile terminal may be configured to display a home screen on the display unit. In the embodiment of FIG. 4, it is assumed that the home screen is displayed on the display unit. However, in other embodiments, other contents can be displayed on the display unit.

Referring to the second drawing of FIG. 4, the mobile terminal can sense a first input 410 in the state in which the mobile terminal is gripped by the user. In this case, the first input 410 may be characterized to have a predetermined area.

In detail, the mobile terminal may sense that the user touches the grip sensor disposed on the side of the mobile terminal with a thumb while the mobile terminal is vertically gripped by the user. In this case, the mobile terminal can sense that the first input 410 corresponds to the user's thumb through at least one of a touched area and position. For example, while the user grips the mobile terminal with the left hand, the user may naturally touch the left and top portion of the mobile terminal.

Referring to the third drawing of FIG. 4, the mobile terminal can display a menu icon 420 on the display unit after sensing the first input 410. In detail, the mobile terminal may display the menu icon 420 at a first point 430 corresponding to the first input 410 on the display unit. In this case, the menu icon 420 may be an icon for displaying an icon list.

In an embodiment of the present invention, when sensing of the first input 410 is terminated, the mobile terminal may stop display of the menu icon 420. That is, when sensing of the first input 410 is terminated, the mobile terminal may switch its state from the third drawing of FIG. 4 to the first drawing of FIG. 4.

As described above, while naturally gripping the mobile terminal, the user can control the mobile terminal to display the menu icon and terminate the display of the menu icon by touching the grip sensor and releasing the touch of the grip sensor.

Figure 5:
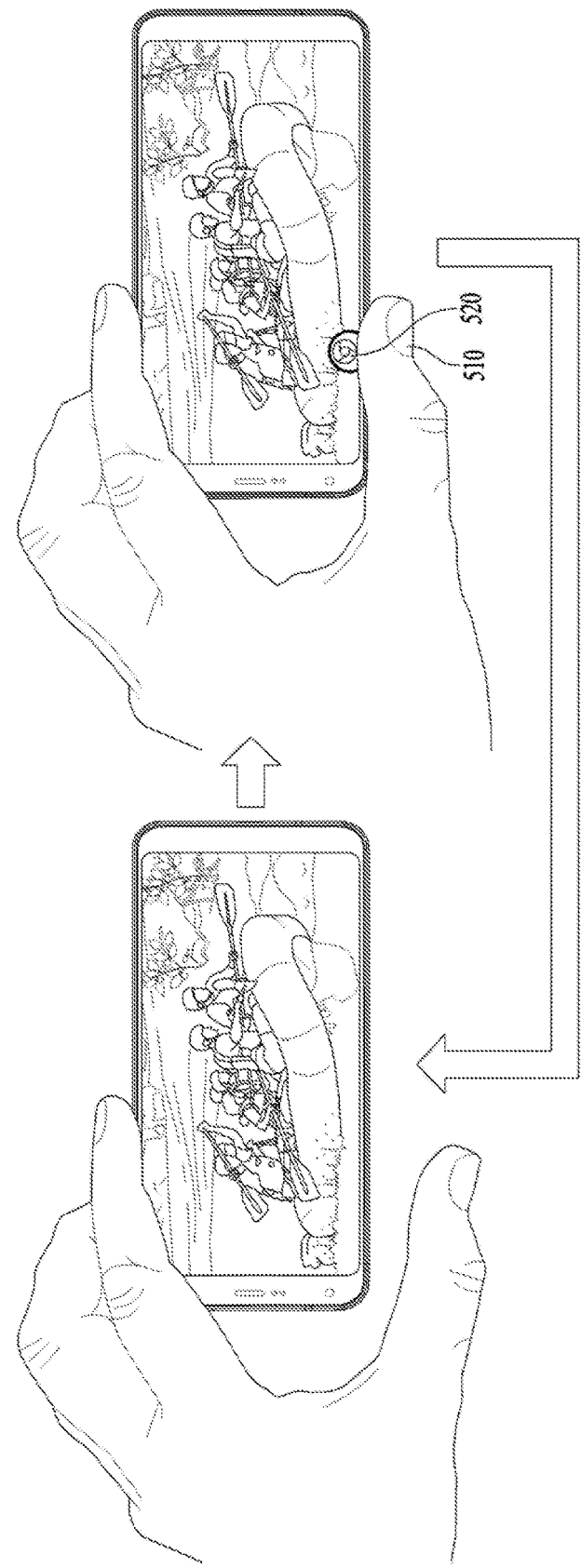
FIG. 5 is a diagram illustrating an embodiment for displaying the menu icon in a state in which a predetermined content is executed by the mobile terminal according to one embodiment of the present invention.

FIG. 5 is a diagram illustrating an embodiment for displaying the menu icon in a state in which a predetermined content is executed by the mobile terminal according to one embodiment of the present invention. To avoid redundant description, the features already mentioned in FIGS. 3 and 4 are omitted in the embodiment of FIG. 5.

Unlike FIG. 4, FIG. 5 shows the embodiment in which when the grip sensor senses an input from the user, the display unit displays the predetermined content rather than the home screen. Moreover, in FIG. 5, the mobile terminal may be rotated vertically unlike FIG. 4. Referring to the first drawing of FIG. 5, the mobile terminal can detect that the user grips the mobile terminal.

Referring to the second drawing of FIG. 5, the mobile terminal can sense a first input 510 in the state in which the mobile terminal is gripped by the user. In this case, the first input 510 may be characterized to have a predetermined area. In detail, the mobile terminal may recognize that while the mobile terminal is gripped, the user touches the grip sensor of the mobile terminal with the remaining fingers. Thereafter, the mobile terminal may sense that a first input 510 with a predetermined area is additionally touched. That is, the mobile terminal may sense that the user touches the mobile terminal with the thumb while gripping the mobile terminal with the remaining fingers.

In FIG. 4, the grip sensor disposed on the both sides of the mobile terminal senses the first input 410 in the state in which the mobile terminal is vertically rotated. On the contrary, in FIG. 5, the grip sensor disposed on the both sides of the mobile terminal senses the first input 510 in the state in which the mobile terminal is horizontally rotated.

In an embodiment of the present invention, the mobile terminal may display a menu icon 520 after sensing the first input 510. In this case, the menu icon 520 may be an icon for launching a predetermined application. That is, the mobile terminal may launch the predetermined application interconnected to the menu icon 520 based on an input signal for selecting the menu icon 520.

In detail, when the mobile terminal senses the first input 510 while displaying the predetermined content on the display unit, the mobile terminal may display the menu icon 520 on the predetermined content in an overlaying manner.

In addition, the mobile terminal may display the menu icon 520 at a point corresponding to the location where the first input 510 is sensed.

In an embodiment of the present invention, the mobile terminal may determine the menu icon 520 based on the predetermined content which is currently executed. In detail, the mobile terminal may store a history of applications, which were executed before the predetermined content that is currently executed or will be executed after the predetermined content. Thus, the mobile terminal may determine the menu icon 520 based the stored application history.

For example, if the predetermined content currently executed is a video content and the user generally uses an Internet application after executing the video content, the mobile terminal may display the menu icon 520 corresponding to the Internet application after sensing the first input 510.

In an embodiment of the present invention, when sensing of the first input 510 is terminated, the mobile terminal may stop display of the menu icon 520. That is, when sensing of the first input 520 is terminated, the mobile terminal may switch its state from the second drawing of FIG. 5 to the first drawing of FIG. 5.

Figure 6:
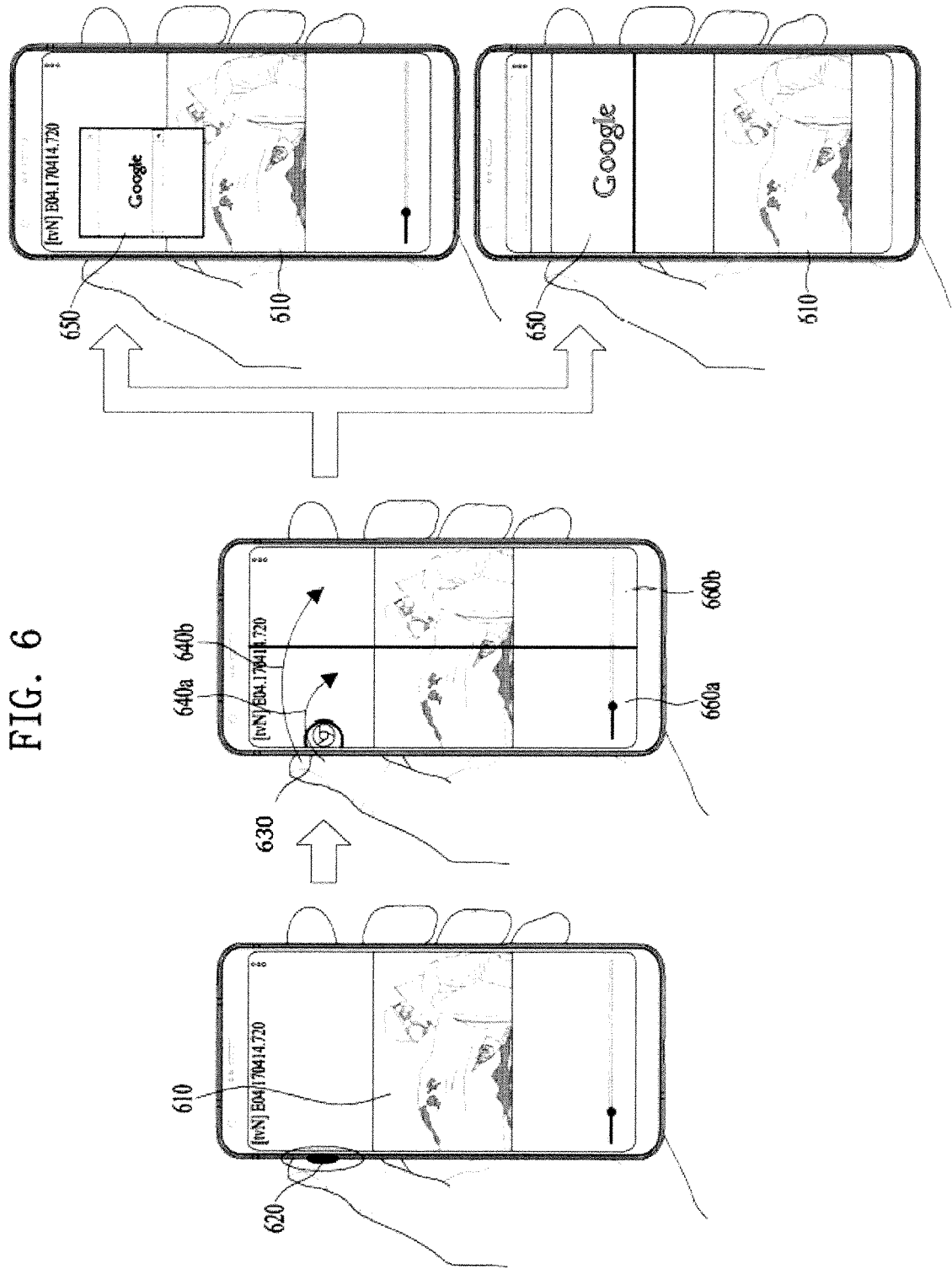
FIG. 6 is a diagram illustrating an embodiment for executing a multitasking mode of the mobile terminal according to one embodiment of the present invention.

FIG. 6 is a diagram illustrating an embodiment for executing a multitasking mode of the mobile terminal according to one embodiment of the present invention. To avoid redundant description, the features already mentioned in FIGS. 3 to 5 are omitted in the embodiment of FIG. 6.

Referring to the first drawing of FIG. 6, the mobile terminal can sense a first input 620 while executing a predetermined content 610. For example, the predetermined content may be a video content. In detail, the mobile terminal may sense the first input 620 with a predetermined area through the grip sensor while executing the video content 610.

In an embodiment of the present invention, the mobile terminal may display a menu icon 630 after sensing the first input 620. In this case, the menu icon 630 may be displayed at a point corresponding to the location where the first input 620 is sensed. In addition, the menu icon 630 may be an icon for launching a predetermined application 650.

Referring to the second drawing of FIG. 6, the mobile terminal can sense a second input 640a or 640b while displaying the menu icon 630. In this case, the second input 640a or 640b may be continuously inputted with the first input 620. In detail, the mobile terminal may sense the second input 640a or 640b while maintaining the first input 620 in the state in which the mobile terminal displays the menu icon 630 according to the first input 620. For example, the user may touch the grip sensor with the thumb so that the mobile terminal may display the menu icon 630. Thereafter, the user may drag the menu icon 630 without releasing the thumb. In this case, the mobile terminal may move the menu icon 630 according to the second input 640a or 640b.

In an embodiment of the present invention, the mobile terminal may launch the predetermined application 650 corresponding to the menu icon 630 in the multitasking mode after sensing the second input 640a or 640b.

Hereinafter, a description will be given of an embodiment in which the mobile terminal launches the predetermined application 650 in different multitasking modes based on a location where the second input 640a or 640b is touch-released or a moving distance of the second input 640a or 640b. Although the embodiment is described with reference to the location where the second input 640a or 640b is touch-released, it is a matter of course that the embodiment can be applied with reference to the moving distance of the second input 640a or 640b.

The third drawing (a) of FIG. 6 shows a case in which the location where the second input 640a is touch-released is relatively close to that of the first input 620. On the contrary, the third drawing (b) of FIG. 6 shows a case in which the location where the second input 640b is touch-released is relatively far from that of the first input 620.

For example, the mobile terminal may vertically partition the display unit of the mobile terminal into a first area 660a and a second area 660b. In other words, the first area 660a may correspond to the left area of the display unit and the second area 660b may correspond to the right area of the display unit.

In an embodiment of the present invention, when the location where the second input 640a is touch-released is within the first area 660a, the mobile terminal may launch the predetermined application 650 in a first multitasking mode as shown in the third drawing (a) of FIG. 6. In this case, the first multitasking mode may be a mode for overlaying the application 650 with the predetermined content 610 and displaying the overlaid application 650. That is, when the location where the second input 640a is touch-released is within the first area 660a, the mobile terminal may display the predetermined application 650 on the predetermined content 610 in an overlaying manner.

Further, in another embodiment of the present invention, when the location where the second input 640b is touch-released is within the second area 660b, the mobile terminal may launch the predetermined application 650 in a second multitasking mode as shown in the third drawing (b) of FIG. 6. In this case, the second multitasking mode may be a mode for displaying the predetermined application 650 and the predetermined content 610 on a dual window. That is, when the location where the second input 640b is touch-released is within the second area 660b, the mobile terminal may display the predetermined application 650 and the predetermined content 610 on the display unit by partitioning the display unit. For example, when the location where the second input 640b is touch-released is within the second area 660b, the mobile terminal may respectively display the predetermined application 650 and the predetermined content 610 on the top and bottom portions of the display unit.

Figure 7:
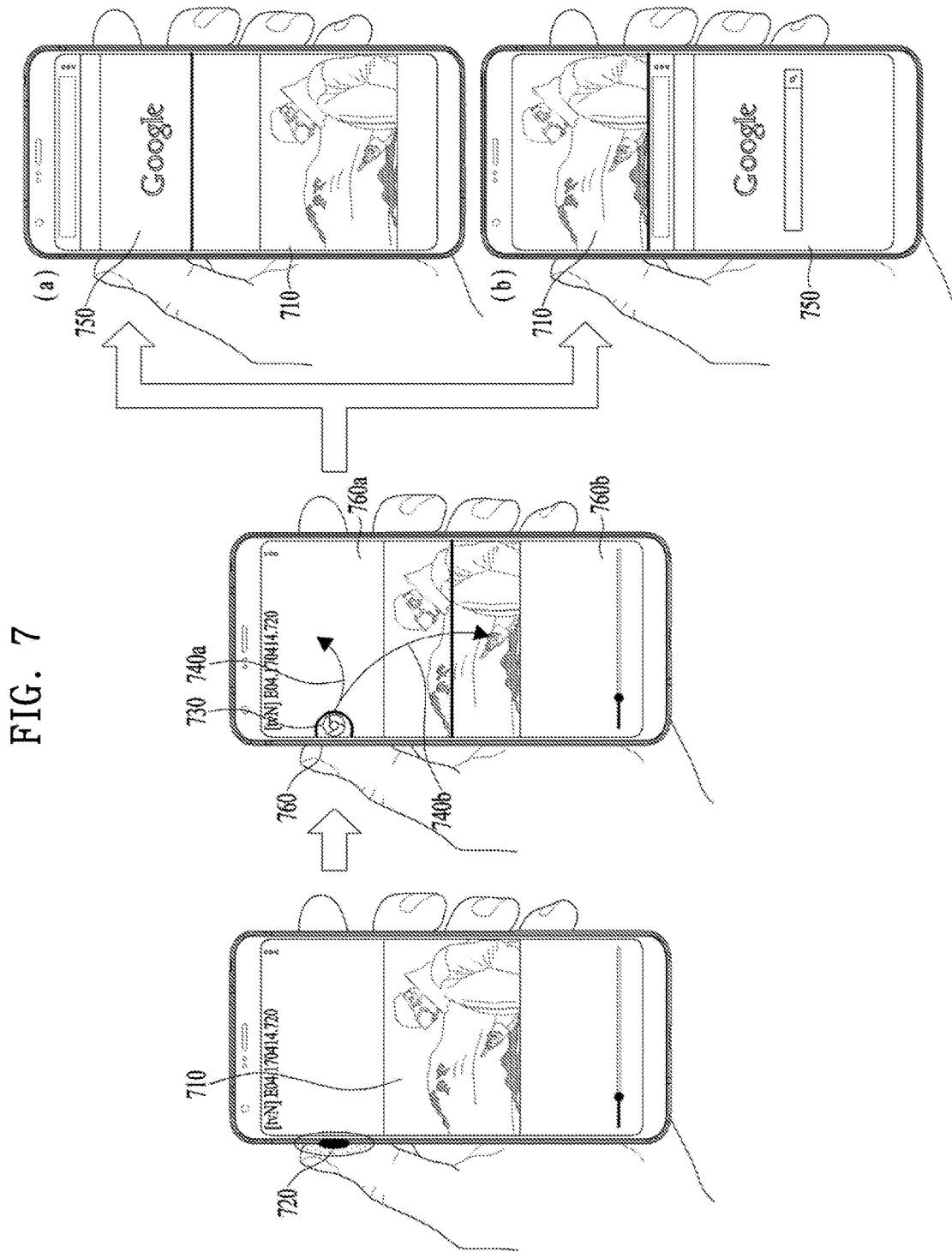
FIG. 7 is a diagram illustrating an embodiment for executing the multitasking mode depending on a position where an input is touched and released in the mobile terminal according to one embodiment of the present invention.

FIG. 7 is a diagram illustrating an embodiment for executing the multitasking mode depending on a position where an input is touched and released in the mobile terminal according to one embodiment of the present invention. To avoid redundant description, the features already mentioned in FIGS. 3 to 6 are omitted in the embodiment of FIG. 7.

The first drawing of FIG. 7 matches the first drawing of FIG. 6. That is, referring to the first drawing of FIG. 7, the mobile terminal can sense a first input 720 through the grip sensor while playing a video content 710. In an embodiment of the present invention, the mobile terminal may display a menu icon 730 after sensing the first input 720. In this case, the menu icon 730 may be an icon for launching a predetermined application 750.

Referring to the second drawing of FIG. 7, the mobile terminal can sense a second input 740a or 740b which is continuously inputted with the first input 720 while displaying the menu icon 730. In an embodiment of the present invention, the mobile terminal may launch the predetermined application 750 corresponding to the menu icon 730 after sensing the second input 740a or 740b.

Compared to the embodiment of FIG. 6, in the embodiment of FIG. 7, the predetermined application 750 and the predetermined content 710 are displayed on a dual window.

Hereinafter, a description will be given of an embodiment in which the mobile terminal determines display areas when launching the predetermined application 750 in the multitasking mode based on a location where the second input 740a or 740b is touch-released or a moving distance of the second input 740a or 740b.

The third drawing (a) of FIG. 7 shows a case in which the location where the second input 740a is touch-released is included in the top portion of the display unit. On the contrary, the third drawing (b) of FIG. 7 shows a case in which the location where the second input 740b is touch-released is included in the bottom portion of the display unit.

For example, the mobile terminal may horizontally partition the display unit of the mobile terminal into a first area 760a and a second area 670b. That is, the first area 760a may correspond to the top area of the display unit and the second area 760b may correspond to the bottom area of the display unit.

In an embodiment of the present invention, when the location where the second input 740a is touch-released is within the first area 760a, the mobile terminal may respectively display the predetermined application 750 and the predetermined content 710 on the top and bottom portions of the display unit as shown in the third drawing (a) of FIG. 7.

Further, in another embodiment of the present invention, when the location where the second input 740b is touch-released is within the second area 760b, the mobile terminal may respectively display the predetermined application 750 and the predetermined content 710 on the bottom and top portions of the display unit as shown in the third drawing (b) of FIG. 7.

A ratio of areas for displaying the predetermined application 750 and the predetermined content 710 will be described in detail with reference to FIG. 8.

Figure 8:
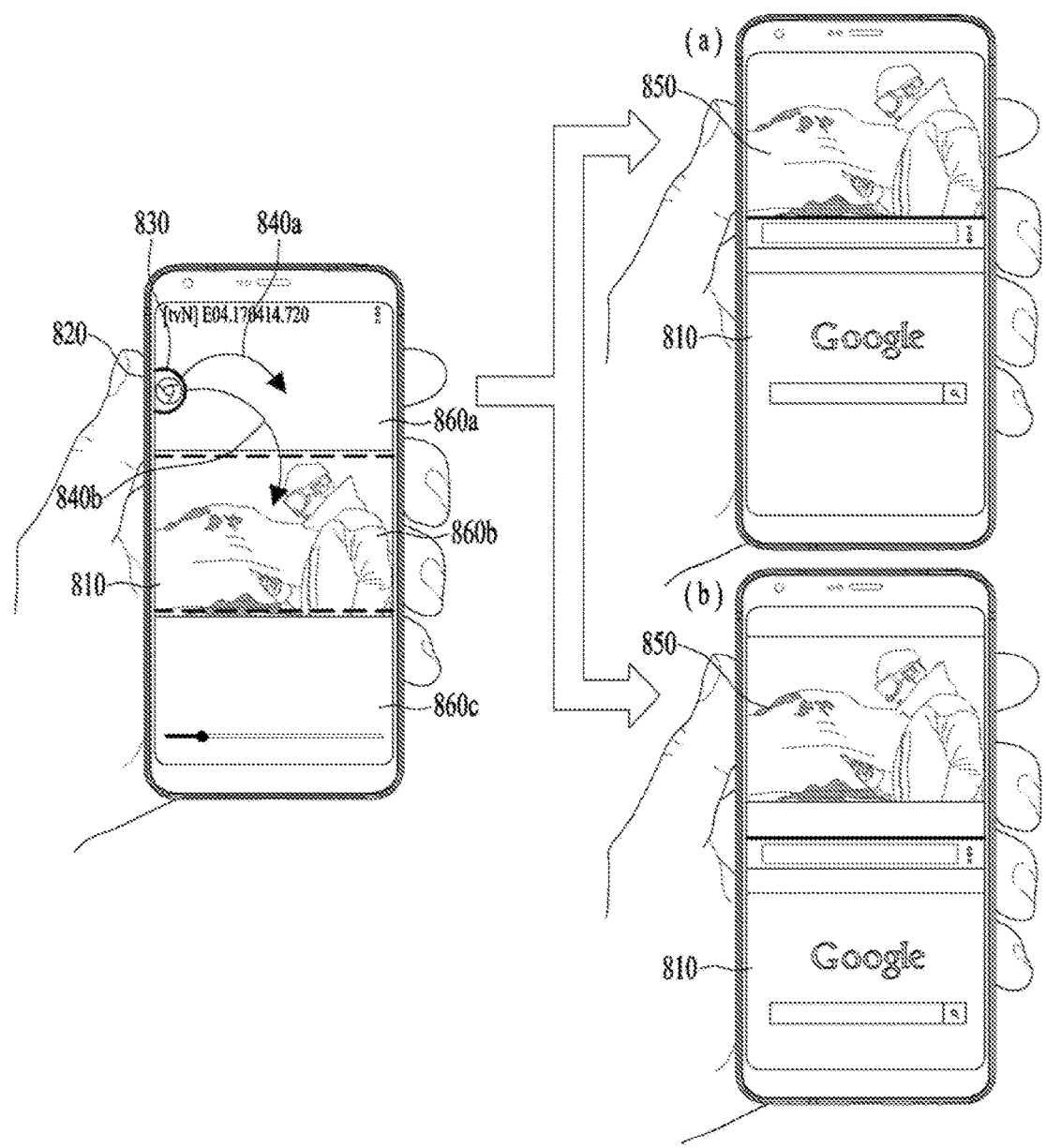
FIG. 8 is a diagram illustrating another embodiment for executing the multitasking mode depending on a position where an input is touched and released in the mobile terminal according to one embodiment of the present invention.

FIG. 8 is a diagram illustrating another embodiment for executing the multitasking mode depending on a position where an input is touched and released in the mobile terminal according to one embodiment of the present invention. To avoid redundant description, the features already mentioned in FIGS. 3 to 7 are omitted in the embodiment of FIG. 8.

Compared to the embodiment of FIG. 7, in the embodiment of FIG. 8, a predetermined application 850 and a predetermined content 810 are displayed on a dual window, an area for displaying the predetermined application 850 is placed lower than that for displaying the predetermined content 810, and a size of the displayed predetermined application 850 is changed.

The first drawing of FIG. 8 matches the second drawing of FIG. 7. That is, referring to the first drawing of FIG. 8, the mobile terminal can sense a first input 820 while playing the video content 810 and then display a menu icon 830 corresponding to the predetermined application 850.

In an embodiment of the present invention, the mobile terminal can sense a second input 840a or 840b, which is continuously inputted with the first input 820, while displaying the menu icon 830 and then launch the predetermined application 850 corresponding to the menu icon 830 in the multitasking mode. In addition, the mobile terminal can display the predetermined application 850 and the predetermined content 810 on the dual window after sensing the second input 840a or 840b.

Hereinafter, a description will be given of an embodiment in which the mobile terminal determines display area sizes when launching the predetermined application 850 in the multitasking mode based on a location where the second input 840a or 840b is touch-released or a moving distance of the second input 40a or 840b.

The second drawing (a) of FIG. 8 shows a case in which the location where the second input 840a is touch-released is included in a first area 860a. On the contrary, the second drawing (b) of FIG. 8 shows a case in which the location where the second input 840b is touch-released is included in a second area 860b.

For example, the mobile terminal may vertically partition the display unit of the mobile terminal into the first area 860a, the second area 860b, and a third area 860c. That is, the first area 860a may correspond to the top area of the display unit, the second area 860b may correspond to the middle area of the display unit, and the third area 860c may correspond to the bottom area of the display unit.

In an embodiment of the present invention, when the location where the second input 840a is touch-released is within the first area 860a, the mobile terminal may display the predetermined application 850 on the top ⅓ area of the display unit and display the predetermined content 810 on the bottom ⅔ area of the display unit as shown in the second drawing (a) of FIG. 8.

Further, in another embodiment of the present invention, when the location where the second input 840b is touch-released is within the second area 860b, the mobile terminal may display the predetermined application 860 on the top ½ area of the display unit and display the predetermined content 810 on the bottom ½ area of the display unit as shown in the second drawing (b) of FIG. 8.

That is, by portioning an area where the second input 840a or 840b is touch-released into three pieces, the mobile terminal may configure the ⅓ area, ½ area, and ⅔ area to launch the predetermined application 850. However, the embodiment in which the mobile terminal partitions the area where the second input 840a or 840b is touch-released into the three pieces and then configures the three areas to launch the predetermined application 850 is merely exemplary and it is a matter of course that the embodiment can be changed.

Figure 9:
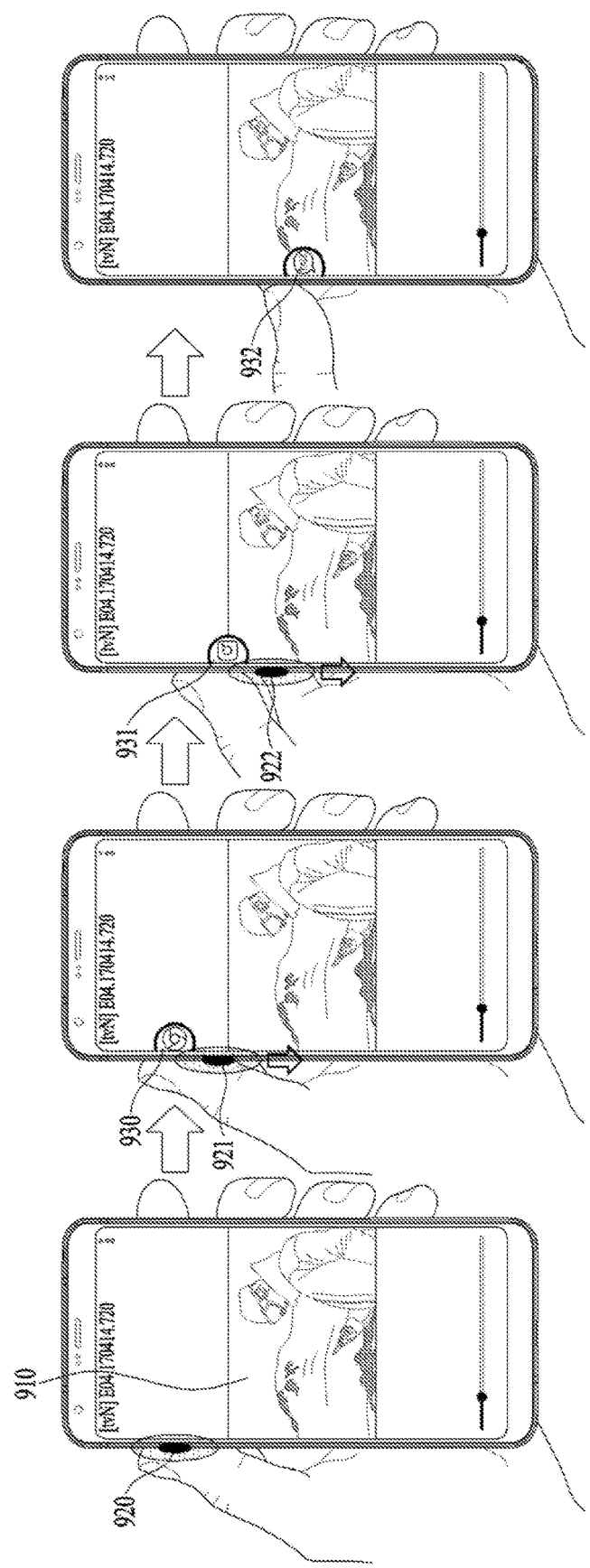
FIG. 9 is a diagram illustrating an embodiment for changing the menu icon of the mobile terminal according to one embodiment of the present invention.

FIG. 9 is a diagram illustrating an embodiment for changing the menu icon of the mobile terminal according to one embodiment of the present invention. To avoid redundant description, the features already mentioned in FIGS. 3 to 8 are omitted in the embodiment of FIG. 9.

The first drawing of FIG. 9 matches the first drawings of FIGS. 5 to 7. That is, the mobile terminal can sense a first input 920 through the grip sensor while launching a predetermined content 910.

Referring to the second drawing of FIG. 9, the mobile terminal can display a first menu icon 930 at a location corresponding to the first input 920 after sensing the first input 920. In this case, the first menu icon 930 may be an icon for launching a first application.

In an embodiment of the present invention, the mobile terminal may sense a second input 921 through the grip sensor while displaying the first menu icon 930. In this case, the second input 921 may be continuously inputted with the first input 920. For example, while gripping the mobile terminal with the left hand, the user may touch (920) the left side of the mobile terminal with the left thumb and then drag (921) the touch toward the bottom side.

Referring to the third drawing of FIG. 9, when the second input 921 is scrolled by a predetermined distance or more, the mobile terminal may change the first menu icon 930 to a second menu icon 931. In this case, the second menu icon 931 may be an icon for launching a second application. In detail, while the mobile terminal displays the first menu icon 930, the user may touch the left side of the mobile terminal with a finger and then scroll the touch toward the bottom side by the predetermined distance or more.

That is, the mobile terminal may move the first menu icon 930 along the side of the display unit based on the second input 921, and when the second input 921 is scrolled by the predetermined distance or more, the mobile terminal may change the first menu icon 930 to the second menu icon 931.

In an embodiment of the present invention, while displaying the second menu icon 931, the mobile terminal may sense a third input 922 through the grip sensor. In this case, the third input 922 may be continuously inputted with the second input 921. For example, while the mobile terminal displays the second menu icon 931 based on the second input 921, the user may still drag (922) the touch toward the bottom side.

Referring to the fourth drawing of FIG. 9, when the third input 922 is scrolled by a predetermined distance or more, the mobile terminal may change the second menu icon 931 to the third menu icon 932. In this case, the third menu icon 932 may be an icon for launching a third application. In detail, while the mobile terminal displays the second menu icon 931, the user may scroll the touch toward the bottom side by the predetermined distance or more without releasing the touch on the left side of the mobile terminal.

That is, the mobile terminal may move the second menu icon 931 along the side of the display unit based on the third input 922, and when the third input 922 is scrolled by the predetermined distance or more, the mobile terminal may change the second menu icon 931 to the third menu icon 932.

In an embodiment of the present invention, the first menu icon 930, second menu icon 931, and third menu icon 932 respectively displayed according to the first input 920, second input 921, and third input 922 may be determined based on the predetermined content 910. In detail, the mobile terminal may determine a menu icon to be displayed based on the first input 920, second input 921, and third input 922 according to what is the predetermined content 910, which is currently launched.

In more detail, the mobile terminal may display a menu icon corresponding to the application that has been frequently launched before the predetermined content 910 or the application that is expected to be frequently launched after the predetermined content 910. Alternatively, the mobile terminal may display a menu icon corresponding to the application that has been frequently launched in the multitasking mode. Further, the mobile terminal may display a menu icon corresponding to the application that is frequently used at the current time.

Additionally, the mobile terminal may determine an application corresponding to the menu icon to be displayed based on a location and movement of the mobile terminal. For example, when the user of the mobile terminal currently moves, the mobile terminal may display a menu icon corresponding to a map application.

Additionally, the mobile terminal may determine an application corresponding to the menu icon to be displayed by considering a calendar application, instant message, recent missed call, unanswered message, etc.

Figure 10:
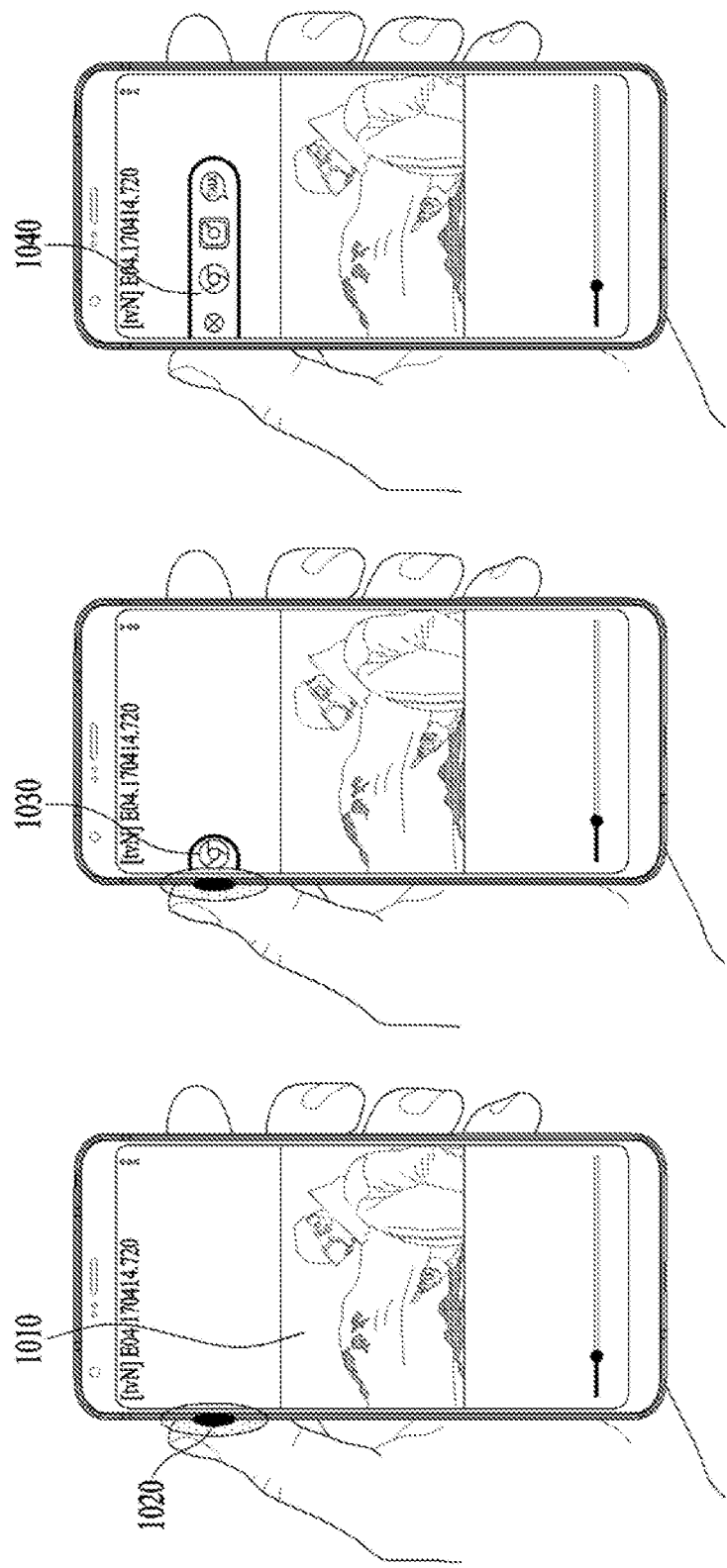
FIG. 10 is a diagram illustrating another embodiment for changing the menu icon of the mobile terminal according to one embodiment of the present invention.

FIG. 10 is a diagram illustrating another embodiment for changing the menu icon of the mobile terminal according to one embodiment of the present invention. To avoid redundant description, the features already mentioned in FIGS. 3 to 9 are omitted in the embodiment of FIG. 10.

The first drawing of FIG. 10 matches the first drawings of FIGS. 5 to 7. That is, the mobile terminal can sense a first input 1020 through the grip sensor while launching a predetermined content 1010.

Referring to the second drawing of FIG. 10, the mobile terminal can display a menu icon 1030 at a location corresponding to the first input 1020 after sensing the first input 1020. In this case, the menu icon 1030 may be an icon for launching a predetermined application.

Referring to the third drawing of FIG. 10, when the mobile terminal senses the first input 1020 during a predetermined time or more while displaying the menu icon 1030, the mobile terminal may change the menu icon 1030 to an icon list 1040 including at least one menu icon. In this case, the icon list 1040 may include at least one menu icon for launching predetermined applications.

In an embodiment of the present invention, the mobile terminal may determine applications corresponding to menu icons included in the icon list 1040 based on the currently executed content 1010. For example, the mobile terminal may display at least one menu icon corresponding to recommended applications in the icon list 1040 based on the currently executed content 1010. Details are the same as described with reference to FIG. 9.

Although not shown in the drawings, the mobile terminal may sense an input signal for selecting a second menu icon included in the icon list 1040 and then launch an application corresponding to the second menu icon. For example, when the mobile terminal displays the icon list 1040, the user may touch the second menu icon to launch the application corresponding to the second menu icon.

Figure 11:
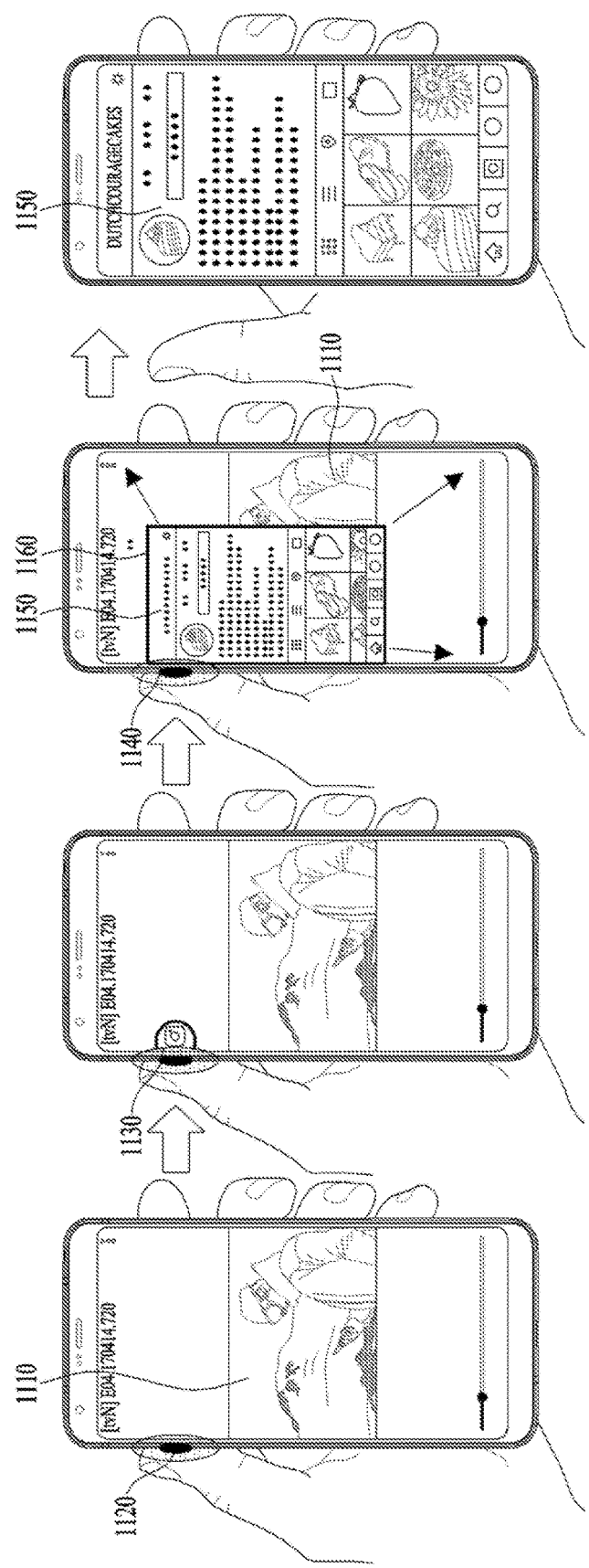
FIG. 11 is a diagram illustrating an embodiment for adjusting a size of an application executed in the multitasking mode by the mobile terminal according to one embodiment of the present invention.

FIG. 11 is a diagram illustrating an embodiment for adjusting a size of an application executed in the multitasking mode by the mobile terminal according to one embodiment of the present invention. To avoid redundant description, the features already mentioned in FIGS. 3 to 10 are omitted in the embodiment of FIG. 11.

The first drawing of FIG. 11 matches the first drawings of FIGS. 5 to 7. That is, the mobile terminal can sense a first input 1120 through the grip sensor while launching a predetermined content 1110.

Referring to the second drawing of FIG. 11, the mobile terminal can display a menu icon 1130 at a location corresponding to the first input 1120 after sensing the first input 1120. In this case, the menu icon 1130 may be an icon for launching a predetermined application 1150.

Referring to the third drawing of FIG. 11, while displaying the menu icon 1130, the mobile terminal can sense a second input 1140. In this case, the second input 1140 may be characterized to have pressure higher than that of the first input 1120. For example, while gripping the mobile terminal with the left hand, the user may touch (1120) the left side of the mobile terminal with the left thumb. Thereafter, the user may touch the left side more strongly without releasing the left thumb after the mobile terminal displays the menu icon 1130.

In an embodiment of the present invention, after sensing the second input 1140, the mobile terminal may display the predetermined application 1150 corresponding to the menu icon 1130 on the predetermined content 1110 in an overlaying manner.

In an embodiment of the present invention, the mobile terminal may adjust a size of an area 1160 for displaying the predetermined application 1150 based on the pressure of the second input 1140. In detail, as the pressure of the second input 1140 increases, the mobile terminal may increase the area 1160 where the predetermined application 1150 is displayed.

Referring to the fourth drawing of FIG. 11, when the size of the area 1160 where the predetermined application 1150 is displayed is equal to or greater than a predetermined value, the mobile terminal may display the predetermined application 1150 on a full screen.

In detail, as the pressure of the second input 1140 increases, the mobile terminal may increase the area 1160 where the predetermined application 1150 is displayed. In addition, when the size of the area 1160 where the predetermined application 1150 is displayed is equal to or greater than the predetermined value, the mobile terminal may execute the predetermined content 1110 in a background state and execute the predetermined application 1150 in a foreground state. By doing so, the mobile terminal may display the predetermined application 1150 on the full screen.

In an embodiment of the present invention, when the size of the area 1160 is equal to or greater than the predetermined value, the mobile terminal may generate at least one of audio feedback, visual feedback, haptic feedback, and vibration feedback. In detail, when the size of the area 1160 where the predetermined application 1150 is displayed is equal to or greater than the predetermined value, the mobile terminal may output feedback to inform that the predetermined application 1150 will be displayed on the full screen.

Although not shown in the drawings, when sensing of the second input 1140 is terminated, the mobile terminal may terminate display of the predetermined application 510. That is, if the user releases the finger while the mobile terminal displays the predetermined application 1150 on the full screen according to the second input 1140, the mobile terminal may terminate the display of the predetermined application 1150. In this case, after terminating the display of the predetermined application 1150, the mobile terminal may continuously display the predetermined content 1110.

Figure 12:
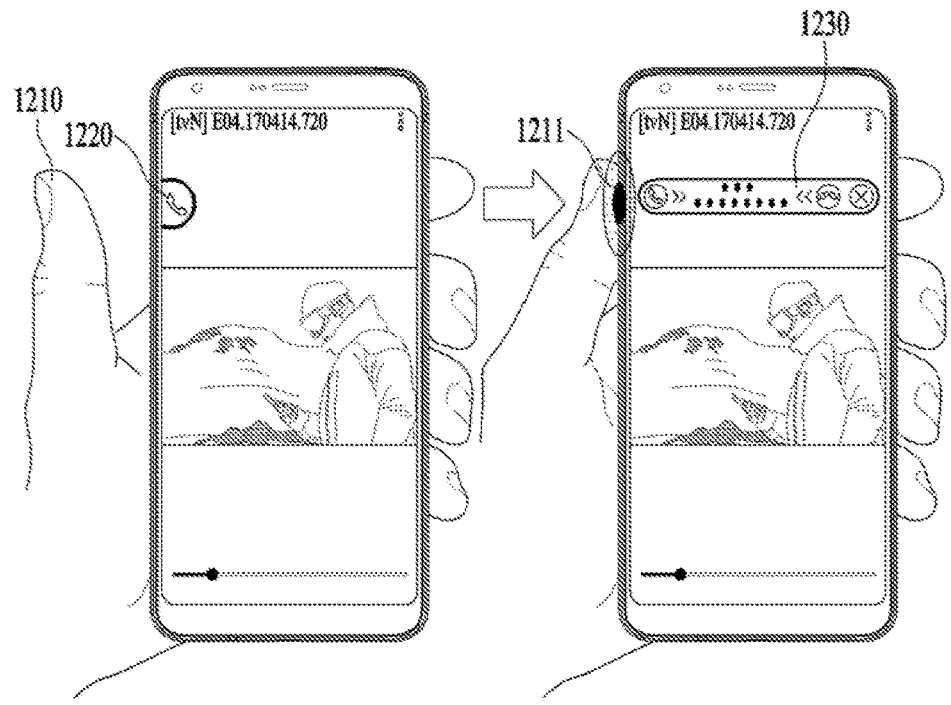
FIG. 12 is a diagram illustrating an embodiment for displaying a menu icon corresponding to a received event on the mobile terminal according to one embodiment of the present invention.
Figure 12:
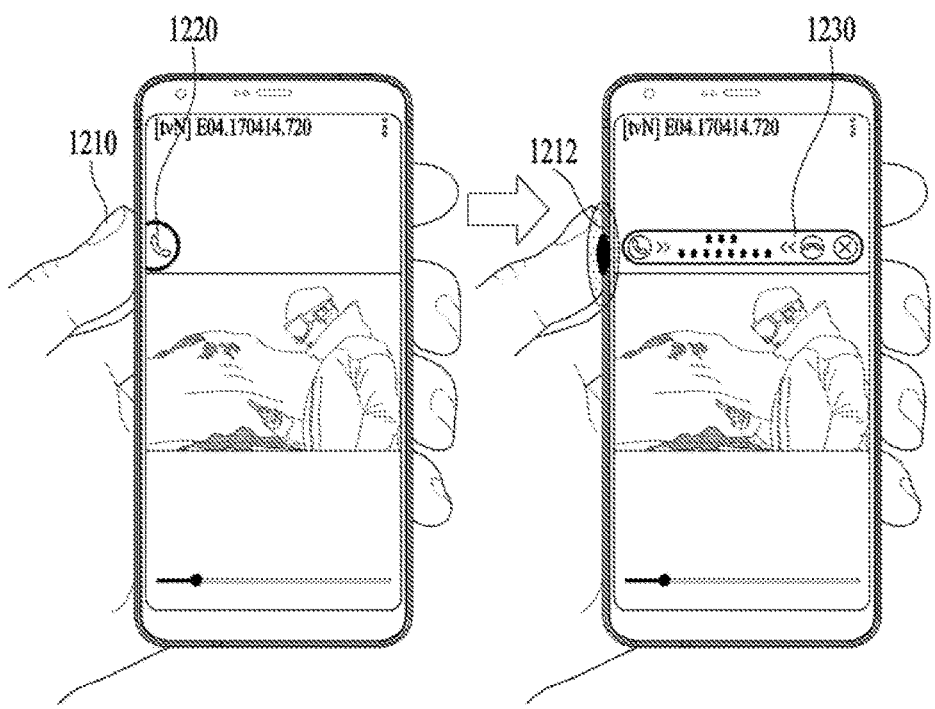

FIG. 12 is a diagram illustrating an embodiment for displaying a menu icon corresponding to a received event on the mobile terminal according to one embodiment of the present invention. To avoid redundant description, the features already mentioned in FIGS. 3 to 11 are omitted in the embodiment of FIG. 12.

Although all drawings of FIG. 12 show that the mobile terminal receives events in a state of being gripped, FIG. 12(*a*) shows an embodiment in which the mobile terminal receives an event without sensing a first input 1210 through the grip sensor while the mobile terminal is gripped and FIG. 12(*b*) shows an embodiment in which the mobile terminal receives an event after sensing the first input 1210 through the grip sensor while the mobile terminal is gripped.

Referring to FIG. 12(*a*), while the mobile terminal is gripped by the user, the mobile terminal can receive the event without sensing the first input 1210 through the grip sensor. When receiving the event, the mobile terminal can display a menu icon 1220. In this case, the mobile terminal may display the menu icon 1220 at a predetermined location. For example, the mobile terminal may display the menu icon 1220 on the top portion of the mobile terminal.

In this case, the menu icon 1220 may be an icon for launching an application corresponding to the received event. For example, when the received event is "call", the menu icon 1220 may be an icon for launching a call application.

In an embodiment of the present invention, the mobile terminal may sense a second input 1211 through the grip sensor while displaying the menu icon 1220. In this case, the second input 1211 may be an input of touching the side of display unit.

After sensing the second input 1211, the mobile terminal may change the menu icon 1220 such that the detail information 1230 is included in the menu icon 1220. Here, the detail information 1230 may be detail information on the received event. For example, when the received event is "call" and the menu icon 1220 is an icon for launching the call application, the detail information 1230 may include "sender" and "sender's number".

Referring to FIG. 12(*b*), while the mobile terminal is gripped by the user, the mobile terminal can receive the event after sensing the first input 1210 through the grip sensor. When the mobile terminal receives the event after sensing the first input 1210, the mobile terminal can display the menu icon 1220 at a location corresponding to the first input 1210.

In an embodiment of the present invention, while displaying the menu icon 1220, the mobile terminal may sense a third input 1212 through the grip sensor. In this case, the third input 1212 may be continuously inputted with the first input 1210. For example, after touching the side of the display unit with a finger, the user may press the side of the display unit without releasing the finger.

In an embodiment of the present invention, after sensing the third input 1212, the mobile terminal may change the menu icon 1220 such that the detail information 1230 is include in the menu icon 1220.

In addition, although not shown in the drawings, it is a matter of course that the mobile terminal can sense a fourth input while displaying the detail information 1230 and then accept or decline reception of the event. For example, when the received event is "call", the mobile terminal may answer or decline "call" after sensing the fourth input.

Figure 13:
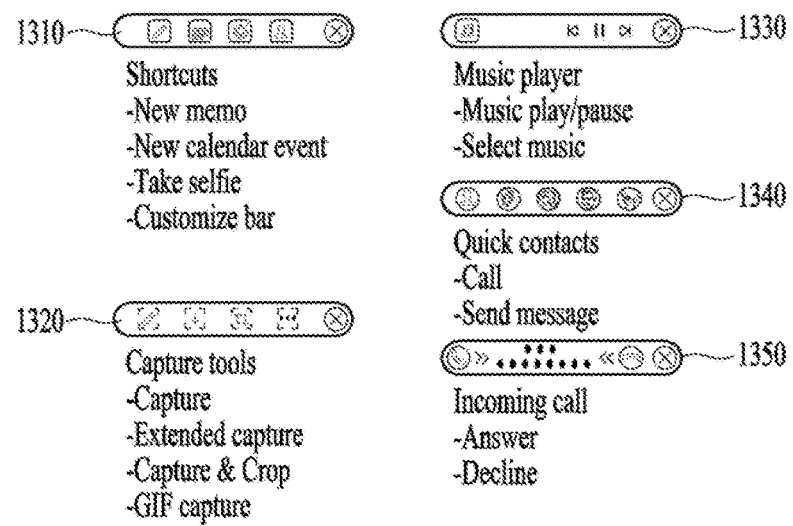
FIG. 13 is a diagram illustrating an embodiment for configuring the menu icon displayed on the mobile terminal according to one embodiment of the present invention.
Figure 13:
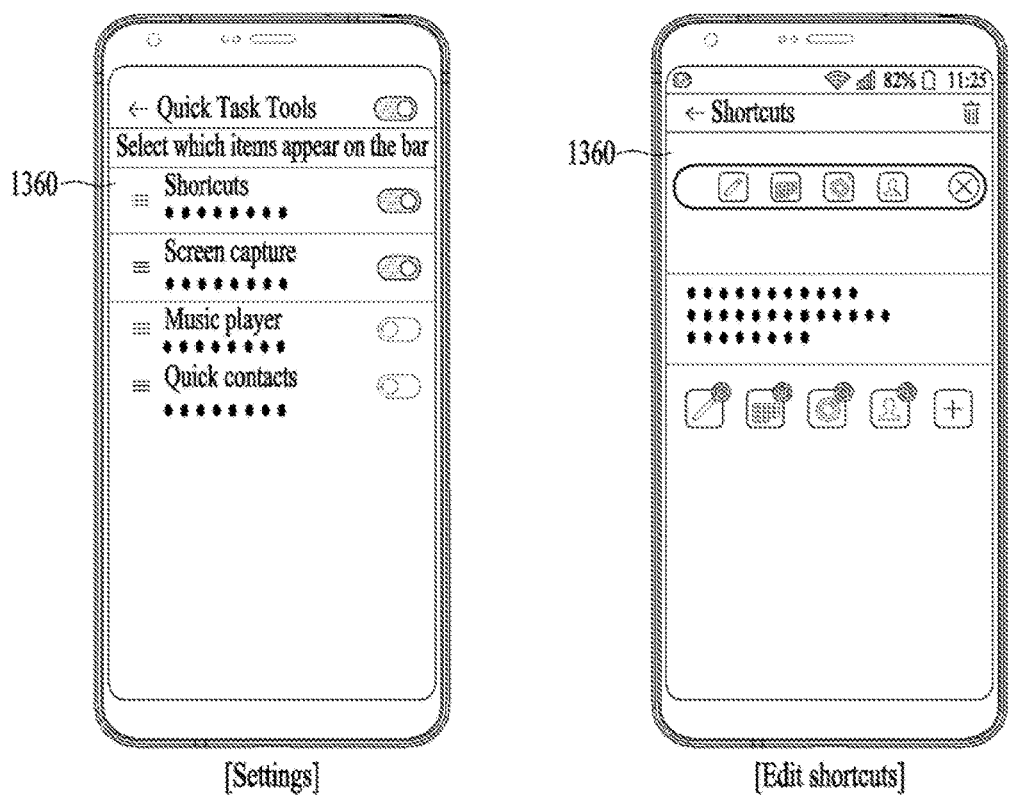

FIG. 13 is a diagram illustrating an embodiment for configuring the menu icon displayed on the mobile terminal according to one embodiment of the present invention. To avoid redundant description, the features already mentioned in FIGS. 3 to 12 are omitted in the embodiment of FIG. 13.

FIG. 13(*a*) shows various examples of the aforementioned menu icon or icon list.

For example, after sensing a first input through the grip sensor, the mobile terminal may display a first icon list 1310. In this case, the first icon list 1310 may be displayed at a location corresponding to the first input. Thus, the first icon list 1310 may include a memo icon, calendar icon, camera icon, cancel icon, etc. Moreover, each icon may be an icon for launching a matched application.

As another example, after sensing a second input through the grip sensor, the mobile terminal may display a second icon list 1320. In this case, the second icon list 1320 may be a list displayed in a state in which a camera application is launched as the predetermined content. Thus, the second icon list 1320 may include a capture icon, enlarged-capture icon, crop icon, GIF-capture icon, etc.

As still another example, after sensing a third input through the grip sensor, the mobile terminal may display a third icon list 1330. In this case, the third icon list 1330 may be a list displayed in a state in which a music application is launched as the predetermined content. Thus, the third icon list 1330 may include a music play icon, music stop icon, music selection icon, etc.

As a further example, after sensing a fourth input through the grip sensor, the mobile terminal may display a fourth icon list 1340. In this case, the fourth icon list 1340 may be a list displayed in a state in which a quick contact application is launched as the predetermined content. Thus, the fourth icon list 1340 may include at least one contact icon and the like.

As a still further example, after sensing a fifth input through the grip sensor, the mobile terminal may display a fifth icon list 1350. In this case, the fifth icon list 1350 may be a list displayed in a state in which a cell event is received from the outside. Thus, the fifth icon list 1350 may include an icon for connecting a call event, an icon for declining a call event, etc.

In an embodiment of the present invention, when the mobile terminal senses a touch input for flicking the first menu icon 1310 while display the first menu icon 1310, the mobile terminal may display the second menu icon 1320, third menu icon 1330, fourth menu icon 1340, and fifth menu icon 1350 by sequentially changing the menu icons.

Referring to the first drawing of FIG. 13(*b*), the mobile terminal can configure the menu icon or icon list displayed through a configuration application. In detail, the mobile terminal may activate a predetermined function 1360 of the configuration application. In this case, the predetermined function 1360 may be a function of displaying the menu icon or icon list according to an input sensed through the grip sensor.

Referring to the second drawing of FIG. 13(*b*), the mobile terminal may configure details of the predetermined function 1360. In detail, when sensing a pressure through the grip sensor, the mobile terminal may configure the menu icon to be displayed and at least one icon included in the icon list.

Figure 14:
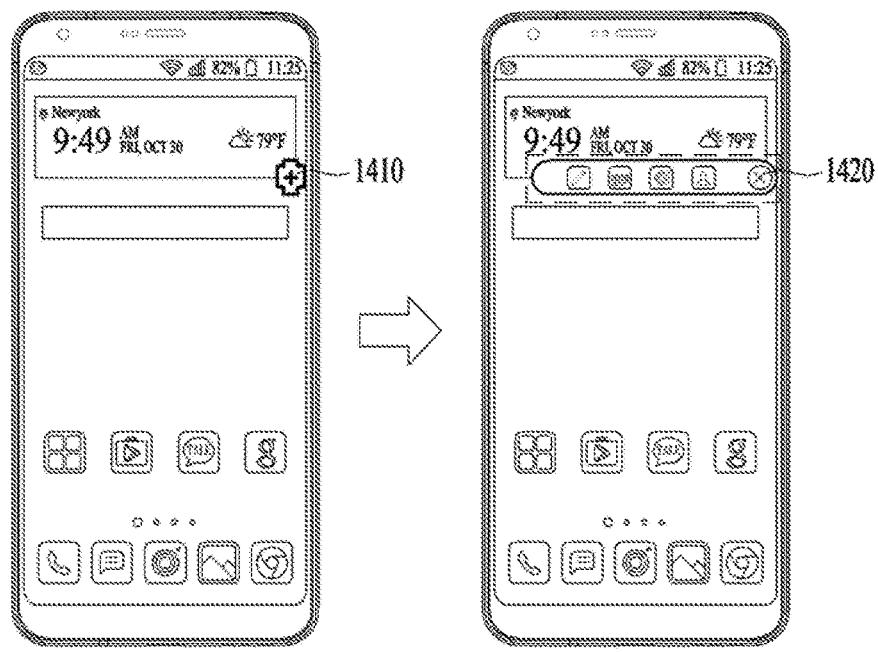
FIG. 14 is a diagram illustrating an embodiment for displaying an icon list on the mobile terminal according to one embodiment of the present invention.
Figure 14:
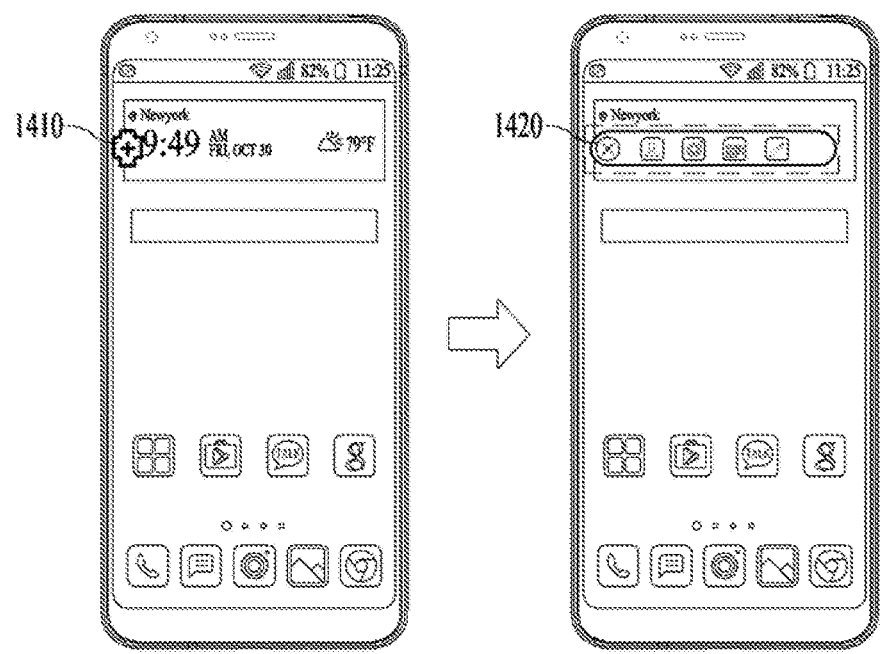

FIG. 14 is a diagram illustrating an embodiment for displaying an icon list on the mobile terminal according to one embodiment of the present invention. To avoid redundant description, the features already mentioned in FIGS. 3 to 13 are omitted in the embodiment of FIG. 14.

Referring to FIG. 14(*a*), the mobile terminal can display a menu icon 1410 on a first side (e.g., the right side) of the display unit. In an embodiment of the present invention, when sensing an input signal (not shown in the drawings) of touching the menu icon 1410, the mobile terminal may change the menu icon 1410 to an icon list 1420 and then display the icon list 1420. In this case, the icon list 1420 may include at least one icon connected to applications. In addition, the mobile terminal may display the icon list 1420 in a spreading manner from the first side where the menu icon 1410 is displayed to the center of the display unit.

Referring to FIG. 14(*b*), the mobile terminal can display the menu icon 1410 on a second side (e.g., the left side) of the display unit. In an embodiment of the present invention, when sensing the input signal (not shown in the drawings) of touching the menu icon 1410, the mobile terminal may change the menu icon 1410 to the icon list 1420 and then display the icon list 1420.

In addition, since the aforementioned embodiments can be applied to the embodiment of FIG. 14, the mobile terminal may perform displaying only when the mobile terminal senses a touch input signal with a predetermined area through the grip sensor in the state in which the mobile terminal is gripped by the user's hand.

Moreover, although in the embodiment of FIG. 14, it is assumed that the menu icon 1410 is displayed in a state in which the home screen is displayed on the display unit, it is a matter of course that the embodiment can be applied to a case in which the menu icon 1410 is displayed in a state in which a different screen is displayed.

Figure 15:
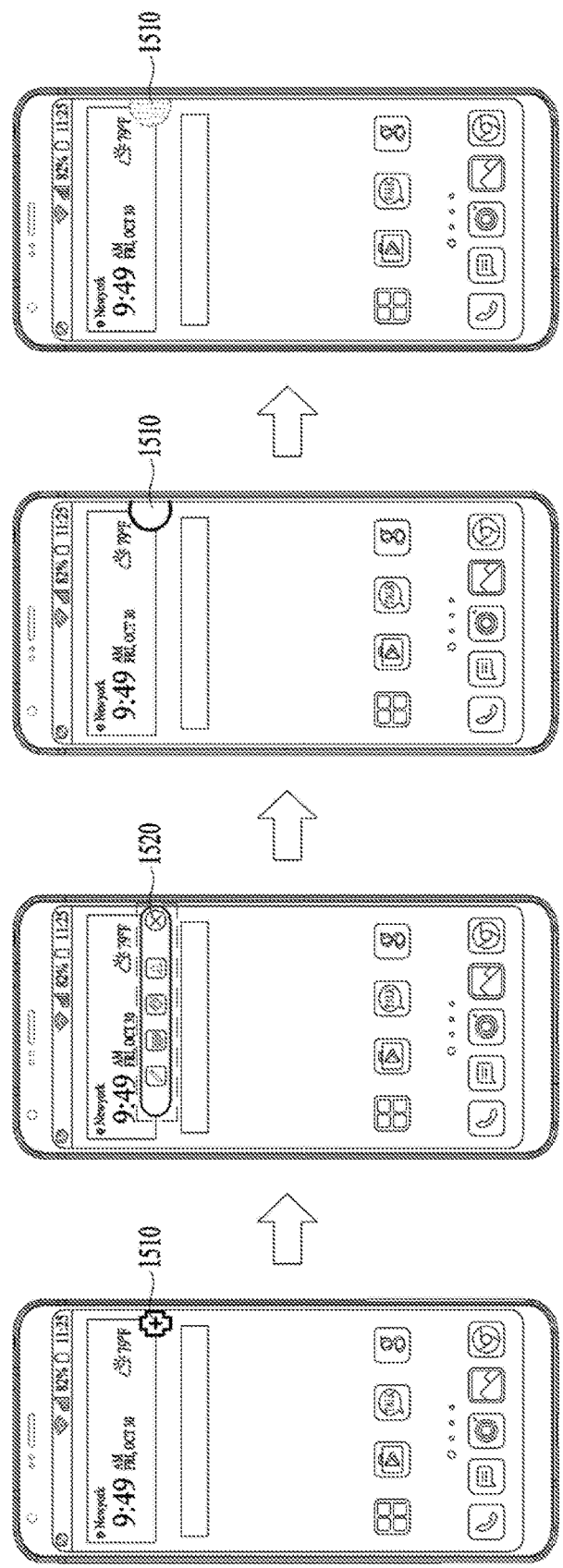
FIG. 15 is a diagram illustrating an embodiment for terminating display of the menu icon on the mobile terminal according to one embodiment of the present invention.

FIG. 15 is a diagram illustrating an embodiment for terminating display of the menu icon on the mobile terminal according to one embodiment of the present invention. To avoid redundant description, the features already mentioned in FIGS. 3 to 14 are omitted in the embodiment of FIG. 15.

The first and second drawings of FIG. 15 match FIG. 14(*a*). That is, after sensing an input signal of touching a menu icon 1510 displayed on the right side of the display unit, the mobile terminal may change the menu icon 1510 to an icon list 1520 and then display the icon list 1520.

Referring to the third drawing of FIG. 15, when detecting a predetermined event, the mobile terminal may change the icon list 1520 to the menu icon 1510 and then display the menu icon 1510. In detail, when the display unit is switched to an inactive state and when the mobile terminal senses an input signal for the go-back button or home button, the mobile terminal may change the icon list 1520 to the menu icon 1510.

Referring to the fourth drawing of FIG. 15, when the mobile terminal detects no input signal during a predetermined time or more while displaying the menu icon 1510, the mobile terminal may translucently display the menu icon 1510. Alternatively, when the mobile terminal senses no input signal during the predetermined time or more while displaying the menu icon 1510, the mobile terminal may transparently display the menu icon 1510.

In addition, although not shown in the drawings, when the mobile terminal detects no input signal during a predetermined time or more while displaying the menu icon 1510, the mobile terminal may stop the display of the menu icon 1510.

That is, when the user does not input any input signals during the predetermined time or more while the mobile terminal displays the predetermined contents and the menu icon 1510, the mobile terminal may understand that the user desires to terminate the display of the menu icon 1510. Therefore, the mobile terminal may terminate the display of the menu icon 1510 or display the menu icon 1510 either translucently or transparently not to prevent the user from watching the predetermined content.

Figure 16:
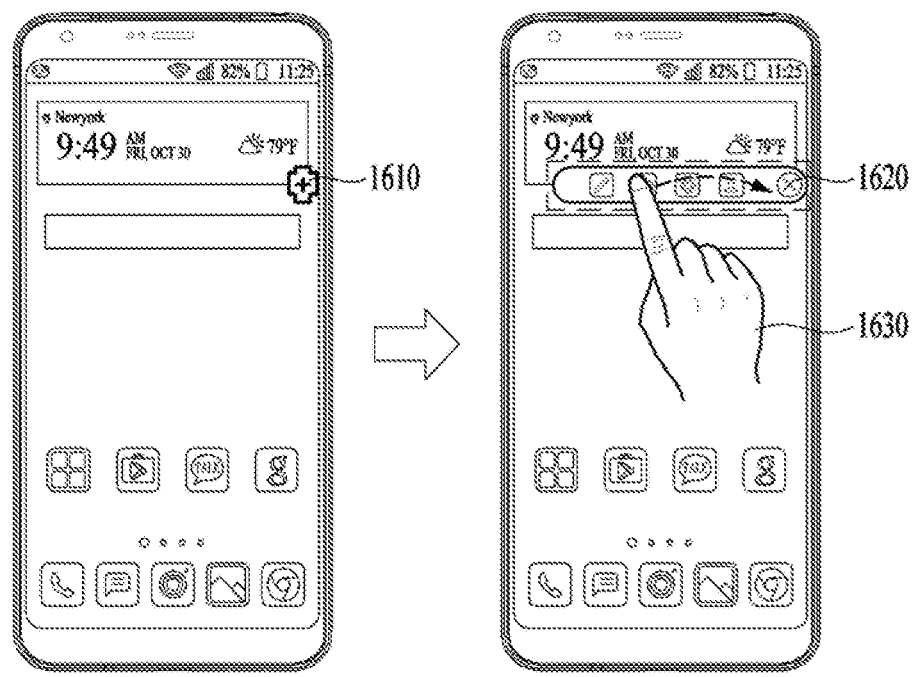
FIG. 16 is a diagram illustrating an embodiment for moving the menu icon displayed on the mobile terminal according to one embodiment of the present invention.

FIG. 16 is a diagram illustrating an embodiment for moving the menu icon displayed on the mobile terminal according to one embodiment of the present invention. To avoid redundant description, the features already mentioned in FIGS. 3 to 15 are omitted in the embodiment of FIG. 16.

Referring to the first drawing of FIG. 16, the mobile terminal may display a menu icon 1610.

Referring to the second drawing of FIG. 16, when sensing a first input signal (not shown in the drawings) of touching the menu icon 1610, the mobile terminal can change the menu icon 1610 to an icon list 1620 and then display the icon list 1620. In this case, the icon list 1620 may include a first icon 1621, second icon 1622, third icon 1623, and fourth icon 1624.

In an embodiment of the present invention, the mobile terminal may sense a second input signal of touching and dragging the second icon 1622. After sensing the second input signal 1630, the mobile terminal may change a location of the second icon 1622 in the icon list 1620.

In detail, when the second input signal 1630 touches the second icon 1622 and is touch-released on the right of the fourth icon 1624, the mobile terminal may move the second icon 1622 to the right of the fourth icon 1624. Thus, the icon list 1620 may be displayed in the following order: first icon 1621, third icon 1623, fourth icon 1624, and second icon 1622.

That is, the user can create a customizing icon list 1620 by easily moving at least one icon included in the displayed icon list 1620.

Figure 17:
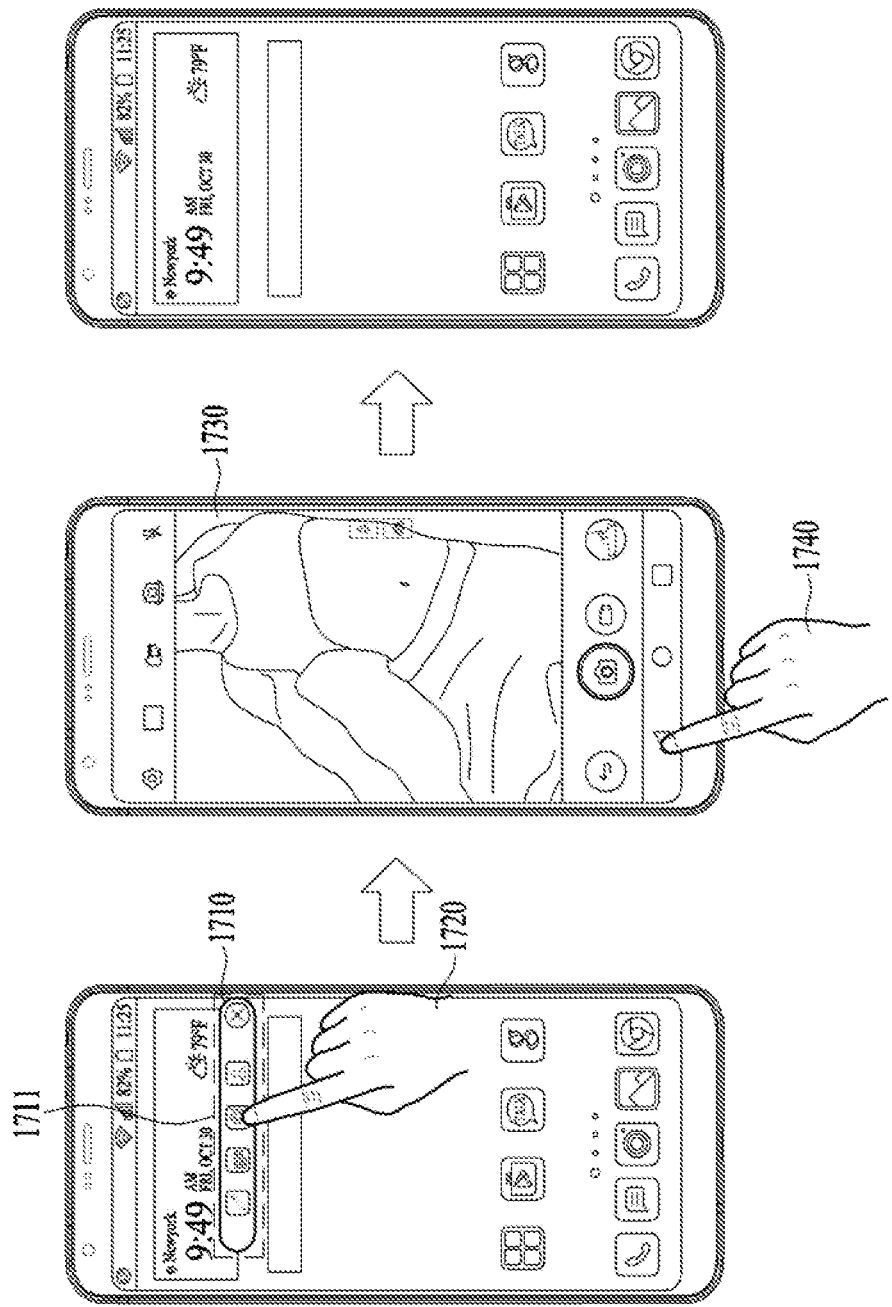
FIG. 17 is a diagram illustrating an embodiment for executing an application corresponding to the menu icon in the mobile terminal according to one embodiment of the present invention.

FIG. 17 is a diagram illustrating an embodiment for executing an application corresponding to the menu icon in the mobile terminal according to one embodiment of the present invention. To avoid redundant description, the features already mentioned in FIGS. 3 to 15 are omitted in the embodiment of FIG. 16.

The first drawing of FIG. 17 matches the second drawing of FIG. 15. That is, the mobile terminal can display an icon list 1710 including at least one icon. In this case the icon list 1710 may include a first icon 1711 for launching a first application 1730. For example, when the first application 1730 is a camera application, the first icon 1711 may be a camera icon.

In an embodiment of the present invention, the mobile terminal may sense a first input 1720 for selecting the first icon 1711. For example, the user may touch the camera icon.

Referring to the second drawing of FIG. 17, after sensing the first input 1720, the mobile terminal can launch the first application 1730. Referring to the aforementioned example, after sensing an input signal of touching the camera icon from the user, the mobile terminal may launch the camera application.

In an embodiment of the present invention, the mobile terminal may sense a second input 1740 for selecting a go-back icon.

Referring to the third drawing of FIG. 17, after sensing the second input 1740, the mobile terminal can terminate the currently launched first application 1730 and then display the previous screen. In detail, when the mobile terminal senses the first input 1720 while displaying the home screen on the display unit of the mobile terminal before launching of the first application 1730, the mobile terminal may launch the first application 1730. Thereafter, when the mobile terminal senses the second input 1740, the mobile terminal may terminate launching of the first application 1730 and then display the home screen.

In addition, in another embodiment of the present invention, when sensing the second input 1740, the mobile terminal may switch to the background state instead of terminating the first application 1730.

Figure 18:
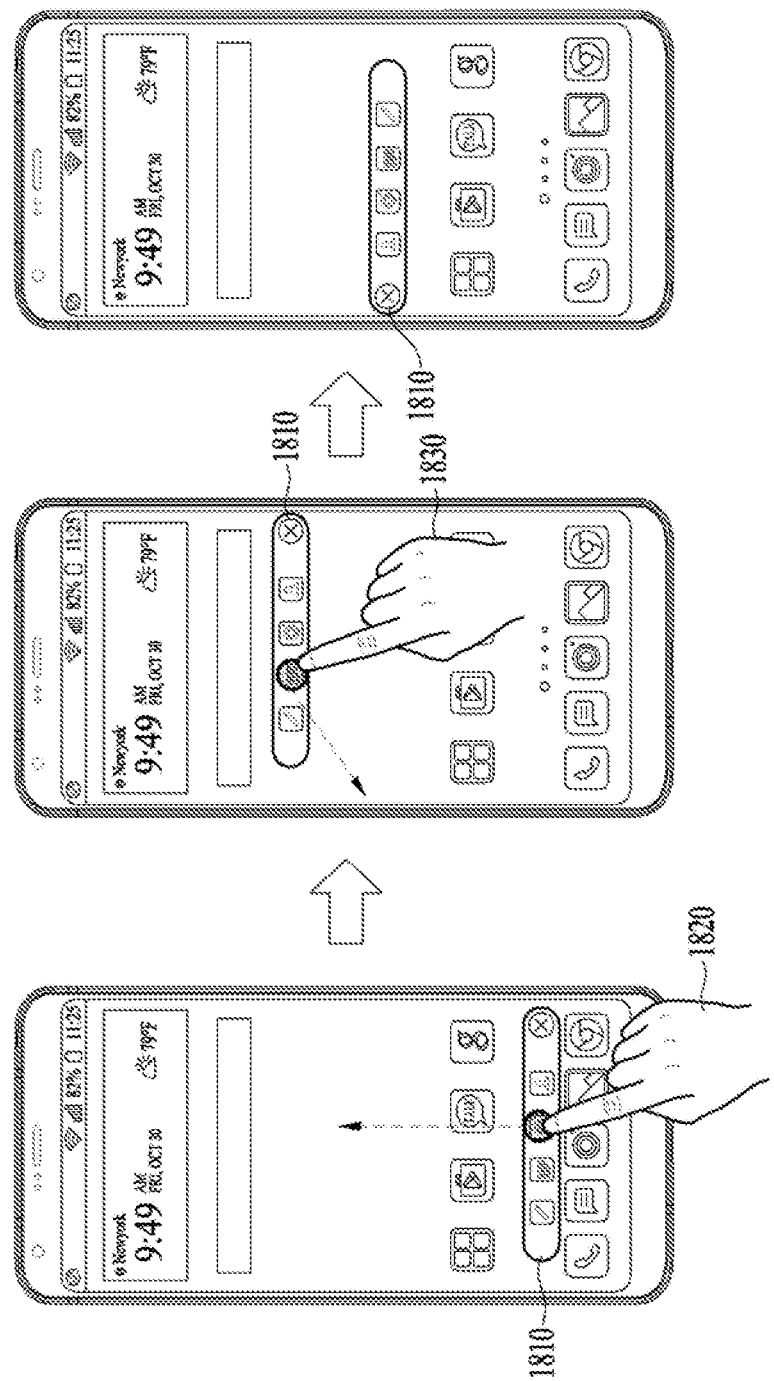
FIG. 18 is a diagram illustrating an embodiment for moving the icon list displayed on the mobile terminal according to one embodiment of the present invention.

FIG. 18 is a diagram illustrating an embodiment for moving the icon list displayed on the mobile terminal according to one embodiment of the present invention. To avoid redundant description, the features already mentioned in FIGS. 3 to 17 are omitted in the embodiment of FIG. 18.

The first drawing of FIG. 18 matches the second drawing of FIG. 15. That is, the mobile terminal can display an icon list 1810 including at least one icon. In an embodiment of the present invention, the mobile terminal may sense a first input 1820 for selecting the icon list 1810. In this case, the first input 1820 may be a touch input signal of touching the icon list 1820 and dragging the icon list 1820 in a first direction.

Referring to the second drawing of FIG. 18, the mobile terminal can move the icon list 1810 according to the first input 1820. In detail, the mobile terminal may move the icon list 1810 to a location where the first input 1820 is touch-released.

In an embodiment of the present invention, the mobile terminal may sense a second input 1830 for selecting the moved icon list 1810 again. In this case, the second input 1830 may be a touch input signal of touching the icon list 1810 and dragging the icon list 1810 in a second direction.

Referring to the third drawing of FIG. 18, the mobile terminal can move the icon list 1810 to a location where the second input 1830 is touch-released. In this case, if the second input 1830 is touch-released on the left or right side of the display unit, the mobile terminal may fix the icon list 1810 to the side where the second input 1830 is touch-released.

For example, in the second drawing of FIG. 18, the icon list 1810 may be displayed on the right side. On the contrary, in the third drawing of FIG. 18, the icon list 1810 may be displayed on the left side.

Figure 19:
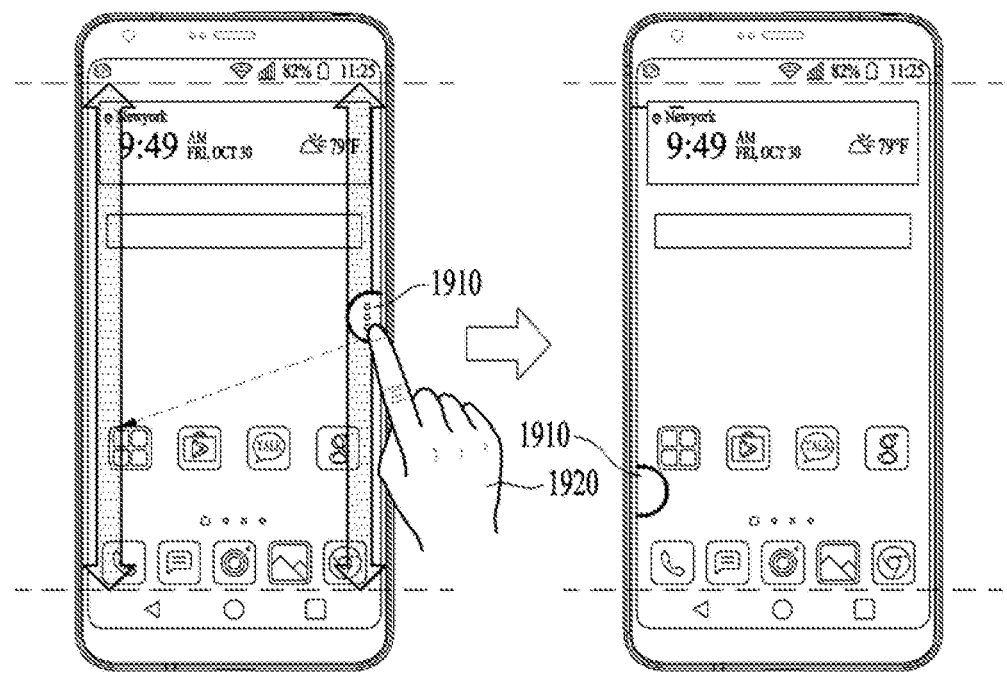
FIG. 19 is a diagram illustrating an embodiment for moving the menu icon displayed on the mobile terminal according to one embodiment of the present invention.

FIG. 19 is a diagram illustrating an embodiment for moving the menu icon displayed on the mobile terminal according to one embodiment of the present invention. To avoid redundant description, the features already mentioned in FIGS. 3 to 18 are omitted in the embodiment of FIG. 19.

Referring to the first drawing of FIG. 19, the mobile terminal can display a menu icon 1910 on a first side of the display unit. In this case, the menu icon 1910 may move along the side of the display unit. For example, when the menu icon 1910 is displayed on the right side of the display unit, the menu icon 1910 may be moved up and down only with respect to the displayed location.

In an embodiment of the present invention, the mobile terminal may sense a first input 1920 and move the menu icon 1910 according to the first input 1920. In this case, the first input 1920 may be a touch input signal of touching the menu icon 1910 and dragging the menu icon 1910 to a second side of the display unit.

Referring to the second drawing of FIG. 19, the mobile terminal can move the menu icon 1910 displayed on the first side of the display unit to the second side according to the first input 1920.

Although not shown in the drawing, after the menu icon 1910 is moved to the second side, the moved menu icon 1910 may also be moved up and down only with respect to the displayed location. For example, when the user selects the menu icon 1910 and then releases the touch of the menu icon 1910 at a random point except the right or left side of the display unit, the mobile terminal may determine whether either the right or left side is closer to the point where the touch of the menu icon 1910 is released and then move the menu icon 1910 to the closer side.

Figure 20:
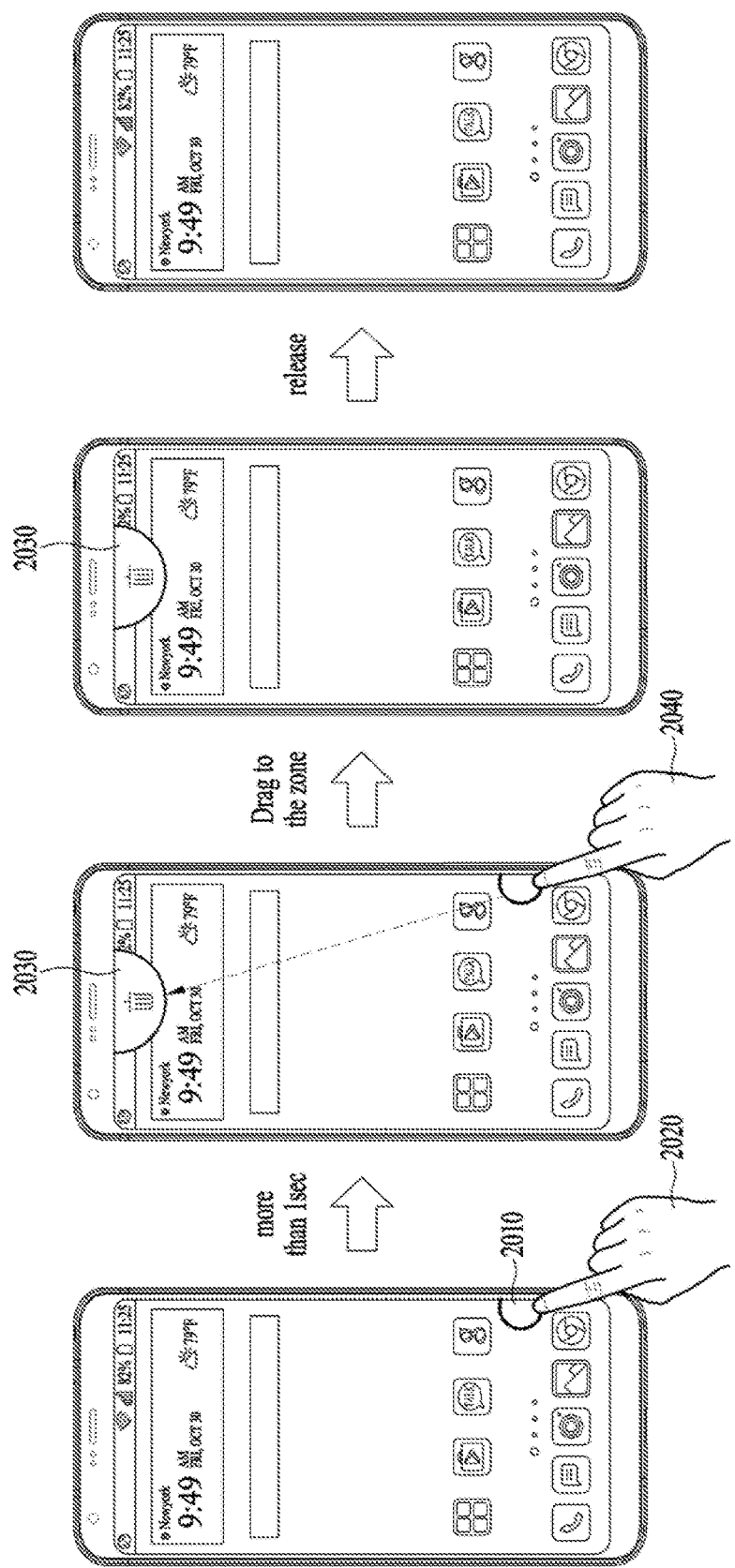
FIG. 20 is a diagram illustrating an embodiment for deleting the menu icon displayed on the mobile terminal according to one embodiment of the present invention.

FIG. 20 is a diagram illustrating an embodiment for deleting the menu icon displayed on the mobile terminal according to one embodiment of the present invention. To avoid redundant description, the features already mentioned in FIGS. 3 to 19 are omitted in the embodiment of FIG. 20.

Referring to the first drawing of FIG. 20, the mobile terminal can display a menu icon 2010 on a first side of the display unit. In an embodiment of the present invention, the mobile terminal may sense a first input 2020 for selecting the menu icon 2010 during a predetermined time or more. For example, the user may select the menu icon 2010 during one second or more.

Referring to the second drawing of FIG. 20, after sensing the first input 2020, the mobile terminal can display a hide icon 2030. In detail, when the user touches the menu icon 2010 during the predetermined time or more, the mobile terminal may display the hide icon 2030 on the top of the display unit. In this case, the hide icon 2030 may be an icon for hiding the menu icon 2020.

In an embodiment of the present invention, the mobile terminal may sense a second input 2040 for selecting the menu icon 2010. In this case, the second input 2040 may be an input signal of touching and dragging the menu icon 2010 and touch-releasing the menu icon 2010 on the hide icon 2030.

Referring to the third drawing of FIG. 20, after sensing the second input 2040, the mobile terminal can stop the display of the menu icon 2010. That is, when the user drags the menu icon 2010 to the hide icon 2030, the mobile terminal may hide the menu icon 2010 displayed on the display unit.

Referring to the fourth drawing of FIG. 20, when sensing of the second input 2040 is terminated, the mobile terminal can stop the display of the hide icon 2030.

Figure 21:
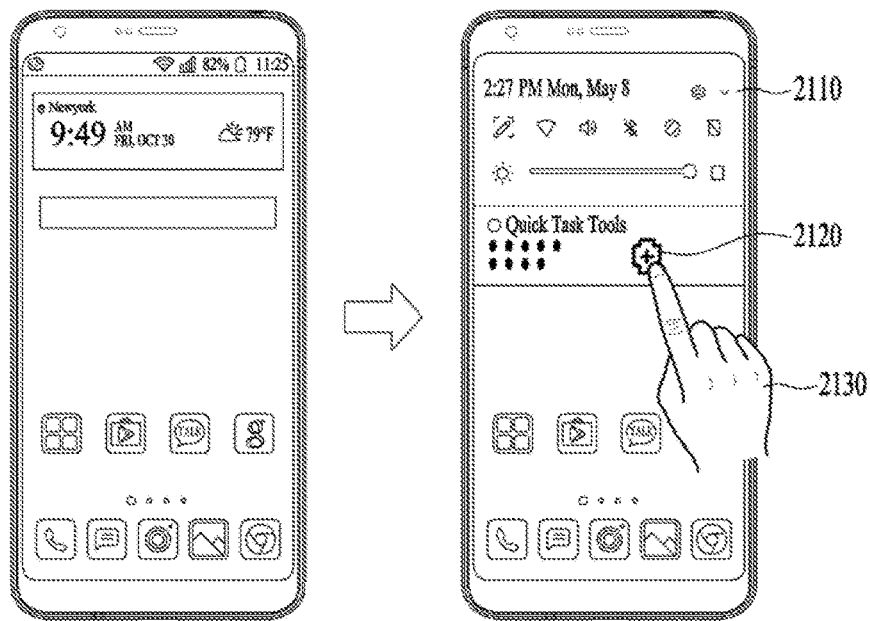
FIG. 21 is a diagram illustrating an embodiment for re-displaying the deleted menu icon on the mobile terminal according to one embodiment of the present invention.

FIG. 21 is a diagram illustrating an embodiment for re-displaying the deleted menu icon on the mobile terminal according to one embodiment of the present invention. To avoid redundant description, the features already mentioned in FIGS. 3 to 20 are omitted in the embodiment of FIG. 21.

The first drawing of FIG. 21 matches the fourth drawing of FIG. 20. That is, the mobile terminal may currently stop display of a menu icon due to dragging of the menu icon to a hide icon.

Referring to the second drawing of FIG. 21, the mobile terminal can sense a first input (not shown in the drawings) for displaying a status bar 2110. Although not shown in the drawings, when the user touches the top of the display unit of the mobile terminal and dragging it toward the bottom side, the mobile terminal can display the status bar 2110. In this case, the status bar 2110 may include a menu bar 2120 for displaying a menu icon.

In an embodiment of the present invention, when sensing a second input 2130 for selecting the menu bar 2120, the mobile terminal may re-display a hidden menu icon. In this case, the mobile terminal may re-display the menu icon at a point where the menu icon was previously displayed. For example, after sensing the second input 2130, the mobile terminal may display the menu icon as shown in the first drawing of FIG. 20.

Although the description has been made for each of the drawings for convenience, the embodiments of the respective drawings may be incorporated to achieve a new embodiment.

Figure 22:
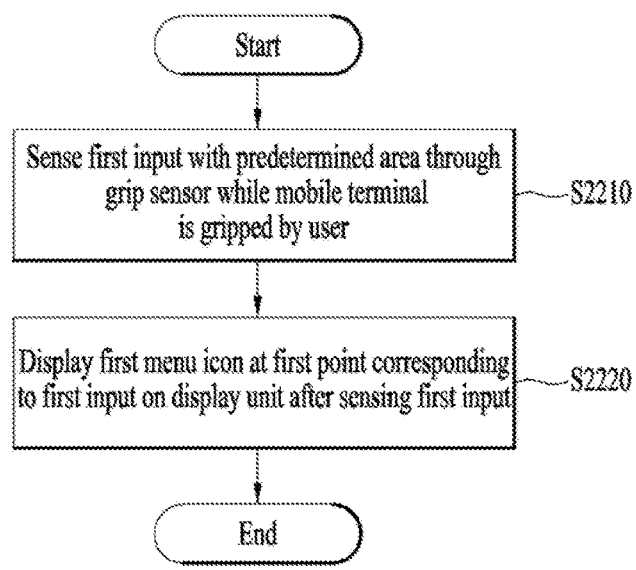
FIG. 22 is a flowchart for explaining an embodiment for displaying a menu icon on a mobile terminal according to one embodiment of the present invention.

FIG. 22 is a flowchart for explaining an embodiment for displaying a menu icon on a mobile terminal according to one embodiment of the present invention.

In step S2210, a mobile terminal can sense a first input with a predetermined area through a grip sensor while the mobile terminal is gripped by a user. The mobile terminal can detect whether the user grips the mobile terminal with a hand through various sensors included in the mobile terminal (e.g., at least one of a proximity sensor, illumination sensor, touch sensor, acceleration sensor, gravity sensor, gyroscope sensor, motion sensor, and sensor which will be developed later).

In addition, the mobile terminal can sense the first input with the predetermined area through the grip sensor. For example, the mobile terminal may sense that the user touches the left side of the mobile terminal with the left thumb while gripping the mobile terminal with the left hand.

In step S2220, after sensing the first input, the mobile terminal can display a first menu icon at a first point corresponding to the first input on the display unit. In this case, the first point may be a point closest to the point where the first input is sensed on the display unit. In addition, the menu icon may be an icon for launching a predetermined application or an icon for displaying an icon list including at least one icon.

It is a matter of course that the embodiments described above with reference to FIGS. 4 to 21 can be implemented as the controlling method for the mobile terminal described in FIG. 20.

In addition, the above-described methods can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer may include the control unit 180 of the terminal. Therefore, the above embodiments are to be construed in all aspects as illustrative and not restrictive. The scope of the present invention should be determined by reasonable interpretation of the appended claims. In addition, the present invention covers the modifications and variations of this invention that come within the scope of the appended claims and their equivalents.

What is claimed is:

1. A mobile terminal comprising:
a sensing unit including a grip sensor;
a display unit; and
a processor,
wherein the processor is configured to:
sense a first input with a predetermined area through the grip sensor in a state in which the mobile terminal is gripped by a user while displaying a predetermined content,
display a first menu icon at a first point corresponding to the first input on the display unit after sensing the first input, wherein the first menu icon is an icon for launching a first application,
sense a second input while displaying the first menu icon, and
in response to touch-releasing of the second input:
select one of a first multitasking mode and a second multitasking mode based on a location at which the second input is touch-released, wherein the first multitasking mode is a mode for displaying the first application on the predetermined content in an overlaying manner and the second multitasking mode is a mode for displaying the predetermined content and the first application on a dual window, and
launch the first application in the selected one of the first multitasking mode and the second multitasking mode.

2. The mobile terminal of claim 1, wherein the processor is configured to determine the first application based on the predetermined content.

3. The mobile terminal of claim 1, wherein the processer is configured to:
sense a third input while displaying the first menu icon, wherein the first and third inputs are continuous; and
when the third input is touch-scrolled by a predetermined distance or more, change the first menu icon to a second menu icon, wherein the second menu icon is an icon for launching a second application.

4. The mobile terminal of claim 3, wherein the third input is sensed on a side of the display unit.

5. The mobile terminal of claim 3, wherein the processor is configured to determine the second application based on the predetermined content.

6. The mobile terminal of claim 1, wherein when the processor senses the first input during a predetermined time or more while displaying the first menu icon, the processor is configured to change the first menu icon to an icon list including at least one menu icon.

7. The mobile terminal of claim 1, wherein the processor is configured to:

sense a fourth input while displaying the first menu icon, wherein the fourth input has a pressure higher than that of the first input; and display the first application on a first area of the content in an overlaying manner after sensing the fourth input.

8. The mobile terminal of claim 7, wherein the processor is configured to adjust a size of the first area based on the pressure of the fourth input.

9. The mobile terminal of claim 7, wherein when a size of the first area becomes equal to or greater than a predetermined value, the processor is configured to display the first application on a full screen.

10. The mobile terminal of claim 7, wherein when a size of the first area becomes equal to or greater than a predetermined value, the processor is configured to generate at least one of audio feedback, visual feedback, haptic feedback, and vibration feedback.

11. The mobile terminal of claim 1, further comprising a communication unit, wherein when an event is received from the communication unit, the processor is configured to change the first menu icon to a fourth menu icon, and wherein the fourth menu icon is an icon for launching an application corresponding to the event.

12. The mobile terminal of claim 1, wherein the processor is configured to move the first menu icon according to the second input.

13. The mobile terminal of claim 1, wherein when sensing of the first input is terminated, the processor is configured to either stop the display of the first menu icon or display the first menu icon transparently.

14. A method for controlling a mobile terminal, the method comprising:

sensing a first input with a predetermined area through a grip sensor in a state in which the mobile terminal is gripped by a user while displaying a predetermined content;

displaying a first menu icon at a first point corresponding to the first input on a display unit after sensing the first input, wherein the first menu icon is an icon for launching a first application;

sensing a second input while displaying the first menu icon; and in response to touch-releasing of the second input:

selecting one of a first multitasking mode and a second multitasking mode based on a location at which the second input is touch-released, wherein the first multitasking mode is a mode for displaying the first application on the predetermined content in an overlaying manner and the second multitasking mode is a mode for displaying the predetermined content and the first application on a dual window; and launching the first application in the selected one of the first multitasking mode and the second multitasking mode.

* * * * *